(12) United States Patent
Ha et al.

(10) Patent No.: US 9,967,598 B2
(45) Date of Patent: May 8, 2018

(54) ADAPTIVE STREAMING METHOD AND APPARATUS

(75) Inventors: Ho-jin Ha, Suwon-si (KR); O-hoon Kwon, Suwon-si (KR); Sung-bin Im, Yongin-si (KR); Guanhua Zhang, Suwon-si (KR); Ji-Eun Keum, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 12/945,498

(22) Filed: Nov. 12, 2010

(65) Prior Publication Data

US 2011/0125918 A1    May 26, 2011

Related U.S. Application Data

(60) Provisional application No. 61/380,461, filed on Sep. 7, 2010, provisional application No. 61/380,489, filed
(Continued)

(30) Foreign Application Priority Data

Oct. 22, 2010 (KR) .................. 10-2010-0103722

(51) Int. Cl.
*G06F 15/16* (2006.01)
*H04N 21/2343* (2011.01)
(Continued)

(52) U.S. Cl.
CPC ... *H04N 21/23439* (2013.01); *H04L 47/2416* (2013.01); *H04L 47/38* (2013.01); *H04L 65/607* (2013.01); *H04L 65/80* (2013.01); *H04N 5/783* (2013.01); *H04N 21/238* (2013.01); *H04N 21/2353* (2013.01); *H04N 21/2362* (2013.01); *H04N 21/234327* (2013.01); *H04N 21/2402* (2013.01); *H04N 21/2541* (2013.01);
(Continued)

(58) Field of Classification Search
CPC .......................... H04N 5/783; H04N 21/2541
USPC .............................. 709/229–245; 725/83–109
See application file for complete search history.

(56) References Cited

U.S. PATENT DOCUMENTS 5,784,528 A    7/1998   Yamane et al.
6,460,087 B1 * 10/2002  Saito ...................... H04L 29/06
                                                           370/465
(Continued)

FOREIGN PATENT DOCUMENTS

CN    1290895 A    4/2001
CN    1459066 A   11/2003
(Continued)

OTHER PUBLICATIONS

Communication dated Mar. 28, 2012 issued by the International Patent office in counterpart International Application No. PCT/KR2011/004064.
(Continued)

*Primary Examiner* — Chris Parry
*Assistant Examiner* — Weiwei Stiltner
(74) *Attorney, Agent, or Firm* — Sughrue Mion, PLLC

(57) ABSTRACT

A method and apparatus for performing streaming that is adaptive to a streaming environment, using information about a plurality of media data generated by encoding content to have different qualities.

10 Claims, 18 Drawing Sheets

Related U.S. Application Data on Sep. 7, 2010, provisional application No. 61/303,778, filed on Feb. 12, 2010, provisional application No. 61/294,211, filed on Jan. 12, 2010, provisional application No. 61/267,131, filed on Dec. 7, 2009, provisional application No. 61/262,708, filed on Nov. 19, 2009, provisional application No. 61/260,906, filed on Nov. 13, 2009.

(51) Int. Cl.

| | | |
|---|---|---|
| H04N 5/783 | (2006.01) | |
| H04N 21/254 | (2011.01) | |
| H04L 12/853 | (2013.01) | |
| H04L 12/811 | (2013.01) | |
| H04N 21/235 | (2011.01) | |
| H04N 21/2362 | (2011.01) | |
| H04N 21/238 | (2011.01) | |
| H04N 21/24 | (2011.01) | |
| H04N 21/2665 | (2011.01) | |
| H04N 21/434 | (2011.01) | |
| H04N 21/4722 | (2011.01) | |
| H04N 21/658 | (2011.01) | |
| H04N 21/81 | (2011.01) | |
| H04N 21/845 | (2011.01) | |
| H04L 29/06 | (2006.01) | |

(52) U.S. Cl.
CPC ....... *H04N 21/2665* (2013.01); *H04N 21/434* (2013.01); *H04N 21/4345* (2013.01); *H04N 21/4722* (2013.01); *H04N 21/6581* (2013.01); *H04N 21/812* (2013.01); *H04N 21/8456* (2013.01)

(56) References Cited

U.S. PATENT DOCUMENTS

| | | | |
|---|---|---|---|
| 6,851,091 B1 | 2/2005 | Honda et al. | |
| 6,895,410 B2 | 5/2005 | Ridge | |
| 7,103,668 B1 | 9/2006 | Corley et al. | |
| 7,318,099 B2* | 1/2008 | Stahl et al. | 709/229 |
| 7,421,127 B2 | 9/2008 | Bruls et al. | |
| 7,447,791 B2 | 11/2008 | Leaning et al. | |
| 7,760,990 B2 | 7/2010 | Kato | |
| 7,944,808 B2 | 5/2011 | Lee et al. | |
| 8,176,029 B2 | 5/2012 | Wang | |
| 8,341,662 B1 | 12/2012 | Bassett et al. | |
| 8,619,851 B2 | 12/2013 | Ito | |
| 8,661,105 B2 | 2/2014 | Tian et al. | |
| 2002/0053085 A1 | 5/2002 | Toguri | |
| 2002/0161739 A1 | 10/2002 | Oh | |
| 2003/0061369 A1 | 3/2003 | Aksu et al. | |
| 2003/0072376 A1 | 4/2003 | Krishnamachari et al. | |
| 2003/0122861 A1* | 7/2003 | Jun | G06F 17/30852 715/720 |
| 2003/0177503 A1 | 9/2003 | Sull et al. | |
| 2003/0189649 A1 | 10/2003 | Kuno | |
| 2003/0236895 A1 | 12/2003 | Ohkubo et al. | |
| 2004/0064572 A1 | 4/2004 | Yamaguchi et al. | |
| 2004/0064573 A1 | 4/2004 | Leaning et al. | |
| 2004/0119814 A1 | 6/2004 | Clisham et al. | |
| 2004/0220966 A1 | 11/2004 | Ridge | |
| 2004/0260689 A1* | 12/2004 | Colace et al. | 707/3 |
| 2005/0018873 A1 | 1/2005 | Rhoads | |
| 2005/0047345 A1 | 3/2005 | Suh | |
| 2005/0071491 A1 | 3/2005 | Seo | |
| 2005/0102371 A1 | 5/2005 | Aksu | |
| 2005/0123136 A1 | 6/2005 | Shin et al. | |
| 2005/0135476 A1 | 6/2005 | Gentric et al. | |
| 2005/0160177 A1 | 7/2005 | Kim | |
| 2005/0183120 A1 | 8/2005 | Jain et al. | |
| 2005/0193138 A1 | 9/2005 | Kim | |
| 2005/0193425 A1 | 9/2005 | Sull et al. | |
| 2005/0198282 A1 | 9/2005 | Stahl et al. | |
| 2005/0234892 A1 | 10/2005 | Tamura | |
| 2005/0262541 A1 | 11/2005 | Oota | |
| 2006/0037057 A1 | 2/2006 | Xu | |
| 2006/0120378 A1 | 6/2006 | Usuki et al. | |
| 2006/0126713 A1 | 6/2006 | Chou et al. | |
| 2006/0212531 A1* | 9/2006 | Kikkawa et al. | 709/217 |
| 2006/0242489 A1* | 10/2006 | Brockway | G06F 17/30309 714/718 |
| 2006/0265436 A1* | 11/2006 | Edmond | G06F 17/30017 |
| 2007/0003251 A1 | 1/2007 | Chung et al. | |
| 2007/0016657 A1 | 1/2007 | Ito | |
| 2007/0025687 A1 | 2/2007 | Kim | |
| 2007/0046982 A1* | 3/2007 | Hull | G06K 9/00442 358/1.15 |
| 2007/0101164 A1 | 5/2007 | Ando et al. | |
| 2007/0177854 A1 | 8/2007 | Ando et al. | |
| 2007/0204003 A1* | 8/2007 | Abramson | H04L 67/06 709/217 |
| 2007/0204011 A1* | 8/2007 | Shaver | H04N 21/4782 709/219 |
| 2007/0204057 A1* | 8/2007 | Shaver | G06F 17/30902 709/231 |
| 2007/0204115 A1* | 8/2007 | Abramson | H04L 67/06 711/154 |
| 2007/0209005 A1* | 9/2007 | Shaver | G06F 17/3089 715/733 |
| 2008/0040498 A1 | 2/2008 | Setlur et al. | |
| 2008/0069204 A1 | 3/2008 | Uchiike | |
| 2008/0109532 A1 | 5/2008 | Denoual et al. | |
| 2008/0177865 A1 | 7/2008 | Heo et al. | |
| 2008/0189617 A1* | 8/2008 | Covell et al. | 715/738 |
| 2008/0195743 A1* | 8/2008 | Brueck et al. | 709/231 |
| 2008/0301380 A1 | 12/2008 | Itho | |
| 2008/0307044 A1* | 12/2008 | Musson | 709/203 |
| 2008/0307475 A1* | 12/2008 | Liwerant et al. | 725/109 |
| 2009/0010273 A1 | 1/2009 | Green et al. | |
| 2009/0018681 A1 | 1/2009 | Lee et al. | |
| 2009/0031007 A1 | 1/2009 | Boic et al. | |
| 2009/0034549 A1* | 2/2009 | Soni et al. | 370/412 |
| 2009/0055417 A1 | 2/2009 | Hannuksela | |
| 2009/0055547 A1* | 2/2009 | Hudson et al. | 709/231 |
| 2009/0089340 A1* | 4/2009 | Ohr et al. | 707/204 |
| 2009/0089535 A1 | 4/2009 | Lohmar et al. | |
| 2009/0097819 A1 | 4/2009 | Dui et al. | |
| 2009/0106288 A1 | 4/2009 | Yang et al. | |
| 2009/0110060 A1 | 4/2009 | Cortes et al. | |
| 2009/0141888 A1 | 6/2009 | Kim et al. | |
| 2009/0187575 A1* | 7/2009 | DaCosta | 707/10 |
| 2009/0204487 A1 | 8/2009 | Cansler et al. | |
| 2009/0258594 A1 | 10/2009 | Martin-Cocher et al. | |
| 2009/0300145 A1 | 12/2009 | Musayev et al. | |
| 2009/0300204 A1* | 12/2009 | Zhang et al. | 709/231 |
| 2010/0046611 A1 | 2/2010 | Toma et al. | |
| 2010/0135636 A1* | 6/2010 | Zhang | H04N 5/783 386/343 |
| 2010/0138489 A1 | 6/2010 | Corley et al. | |
| 2010/0235238 A1* | 9/2010 | Gupta et al. | 705/14.56 |
| 2010/0235472 A1* | 9/2010 | Sood et al. | 709/219 |
| 2010/0235528 A1* | 9/2010 | Bocharov et al. | 709/231 |
| 2011/0029649 A1 | 2/2011 | Tian et al. | |
| 2011/0058675 A1* | 3/2011 | Brueck | H04N 21/2541 380/277 |
| 2011/0083037 A1* | 4/2011 | Bocharov | H04N 21/23116 714/4.11 |
| 2011/0083144 A1* | 4/2011 | Bocharov et al. | 725/32 |
| 2011/0093492 A1* | 4/2011 | Sull et al. | 707/769 |
| 2011/0119394 A1 | 5/2011 | Wang et al. | |
| 2011/0246616 A1* | 10/2011 | Ronca et al. | 709/219 |
| 2012/0023251 A1* | 1/2012 | Pyle et al. | 709/231 |
| 2015/0256585 A1 | 9/2015 | Brueck et al. | |
| 2016/0323342 A1 | 11/2016 | Luby et al. | |

FOREIGN PATENT DOCUMENTS

| | | |
|---|---|---|
| CN | 1481643 A | 3/2004 |
| CN | 1559119 A | 12/2004 |
| CN | 1568620 A | 1/2005 |

(56) References Cited

FOREIGN PATENT DOCUMENTS

| | | |
|---|---|---|
| CN | 1575603 A | 2/2005 |
| CN | 1592418 A | 3/2005 |
| CN | 1625880 A | 6/2005 |
| CN | 1698378 A | 11/2005 |
| CN | 1764974 A | 4/2006 |
| CN | 1784652 A | 6/2006 |
| CN | 1787422 A | 6/2006 |
| CN | 1902865 A | 1/2007 |
| CN | 1985321 A | 6/2007 |
| CN | 1988547 A | 6/2007 |
| CN | 101014947 A | 8/2007 |
| CN | 101018323 A | 8/2007 |
| CN | 101247511 A | 8/2008 |
| CN | 101321265 A | 12/2008 |
| CN | 101365128 A | 2/2009 |
| CN | 101371307 A | 2/2009 |
| CN | 101459809 A | 6/2009 |
| CN | 101518027 A | 8/2009 |
| CN | 101521583 A | 9/2009 |
| EP | 1 043 892 A1 | 10/2000 |
| EP | 1395014 B1 | 6/2006 |
| EP | 2117143 A2 | 11/2009 |
| JP | 06-252876 A | 9/1994 |
| JP | 200013761 A | 1/2000 |
| JP | 2000-341640 A | 12/2000 |
| JP | 2001-024994 A | 1/2001 |
| JP | 2001-359081 A | 12/2001 |
| JP | 2003-087737 A | 3/2003 |
| JP | 2003-111048 A | 4/2003 |
| JP | 2003-235031 A | 8/2003 |
| JP | 2004-013283 A | 1/2004 |
| JP | 2004-88766 A | 3/2004 |
| JP | 2004-135307 A | 4/2004 |
| JP | 2004-140584 A | 5/2004 |
| JP | 2004-140654 A | 5/2004 |
| JP | 2004-516717 A | 6/2004 |
| JP | 2004-186890 A | 7/2004 |
| JP | 2004-215074 A | 7/2004 |
| JP | 2004-312304 A | 11/2004 |
| JP | 2004-328204 A | 11/2004 |
| JP | 2005-039667 A | 2/2005 |
| JP | 2005-073138 A | 3/2005 |
| JP | 2005-229153 A | 8/2005 |
| JP | 2005-303927 A | 10/2005 |
| JP | 2006-304232 A | 11/2006 |
| JP | 2006-311328 A | 11/2006 |
| JP | 2007-11584 A | 1/2007 |
| JP | 2007-25959 A | 2/2007 |
| JP | 2007/036666 A | 2/2007 |
| JP | 2007-518294 A | 7/2007 |
| JP | 2007-274142 A | 10/2007 |
| JP | 2008-97381 A | 4/2008 |
| JP | 2008-219267 A | 9/2008 |
| JP | 2008-236667 A | 10/2008 |
| JP | 2009-17345 A | 1/2009 |
| JP | 2009-134700 A | 6/2009 |
| JP | 2009-159625 A | 7/2009 |
| JP | 2013-505680 A | 2/2013 |
| KR | 10-0805308 B1 | 2/2008 |
| KR | 10-2008-0099629 A | 11/2008 |
| KR | 10-2009-0001707 A | 1/2009 |
| KR | 10-2009-0028017 A | 3/2009 |
| KR | 10-2009-0036765 A | 4/2009 |
| KR | 1020090063775 A | 6/2009 |
| KR | 10-0920733 B1 | 10/2009 |
| KR | 10-2010-0007368 A | 1/2010 |
| WO | WO 0045297 A1 * | 8/2000 |
| WO | 02/49343 A1 | 6/2002 |
| WO | WO 2004015527 A2 * | 2/2004 |
| WO | 2005/043783 A1 | 5/2005 |
| WO | 2006105158 A1 | 10/2006 |
| WO | 2007/095834 A1 | 8/2007 |
| WO | 2008/062979 A1 | 5/2008 |
| WO | 2008/130191 A1 | 10/2008 |
| WO | 2009/119394 A1 | 10/2009 |
| WO | 2009/158344 A2 | 12/2009 |

OTHER PUBLICATIONS

International Search Report issued by the International Searching Authority in counterpart International Application No. PCT/KR2011/001268 dated Nov. 25, 2011.

International Search Report dated Aug. 16, 2011 in counterpart international application No. PCT/KR2010/008060.

Written Opinion of the International Searching Authority dated Aug. 16, 2011 in counterpart international application No. PCT/KR2010/008060.

International Search Report (PCT/ISA/210) dated Aug. 23, 2011 in the International Patent Application No. PCT/KR2010/008696.

International Search Report (PCT/ISA/210) dated Jul. 13, 2011 in the International Patent Application No. PCT/KR2010/008017.

International Search Report (PCT/ISA/210) dated Jul. 15, 2011 in the International Patent Application No. PCT/KR2010/008068.

International Search Report (PCT/ISA/210) dated Jul. 23, 2011 in the International Patent Application No. PCT/KR2010/008015.

International Search Report (PCT/ISA/210) dated Jul. 8, 2011 in the International Patent Application No. PCT/KR2010/008016.

International Search Report (PCT/ISA/210), dated Nov. 3, 2011, issued by the International Searching Authority in International Patent Application No. PCT/KR2011/001898.

Written Opinion (PCT/ISA/237), dated Nov. 3, 2011, issued by the International Searching Authority in International Patent Application No. PCT/KR2011/001898.

Communication dated Feb. 7, 2014 issued by the European Patent Office in counterpart European Application No. 10830205.0.

Pantos R., et al., "HTTP Live Streaming; draft-pantos-http-live-straming-0.2.txt", Oct. 5, 2009, 20 pgs. total, XP015064407.

Alex Zambelli, "IIS Smooth Streaming Technical Overview", Mar. 31, 2009, 17 pgs. total, XP055009366.

Jin Young Lee et al., "DASH Evaluation Experiment #1: Compositions of Media Presentation (CMP) Proposal Comparison", Oct. 15, 2010, 56 pgs. total, XP030046599.

Wager Zia, "A few comments on LGE proposal about delivery of MPEG-2-TS", Oct. 15, 2010, 3 pgs. total, XP030047157.

Communication dated Feb. 12, 2014 issued by the European Patent Office in counterpart European Application No. 10830206.8.

Communication dated Feb. 12, 2014 issued by the European Patent Office in counterpart European Application No. 10830223.3.

Communication dated Feb. 25, 2014 issued by the European Patent Office in counterpart European Application No. 10830218.3.

Communication dated Mar. 4, 2014 issued by the European Patent Office in counterpart European Application No. 10830204.3.

Jaeyeon Song, et al., "Response to Call for Proposals for HTTP Streaming of MPEG Media standard", Jul. 30, 2010, 60 pgs. total, XP030046369.

Gerard Fernando, et al., "HTTP Streaming Solution-Response to Call for Proposal", Jul. 30, 2010, 32 pgs. total, XP030046346.

European Search Report dated Apr. 25, 2014 issued by the European Patent Office in counterpart European Application No. 10836186.6.

John A. Bocharov, "Smooth Streaming Technical Overview", CM-IPTV0560, Oct. 20, 2009, 18 pgs. total, XP017826991.

Communication dated Apr. 25, 2014 issued by the European Patent Office in counterpart European Application No. 11747701.8.

Communication dated Apr. 25, 2014 issued by the European Patent Office in counterpart European Application No. 11756585.3.

Communication dated Feb. 18, 2014 issued by the State Intellectual Property Office of P.R. China in counterpart Chinese Application No. 201080055449.8.

Communication dated Apr. 15, 2014 issued by the State Intellectual Property Office of P.R. China in counterpart Chinese Application No. 201080061413.0.

Communication dated Aug. 27, 2014, issued by the State Intellectual Property Office of the People's Republic of China in counterpart Chinese Application No. 201080061494.4.

(56) References Cited

OTHER PUBLICATIONS

Communication dated Aug. 4, 2014, issued by the State Intellectual Property Office of the People's Republic of China in counterpart Chinese Application No. 201080061416.4.
Communication dated Aug. 5, 2014, issued by the Japanese Patent Office in counterpart Japanese Application No. 2012-538771.
Communication dated Aug. 20, 2014, issued by the State Intellectual Property Office of the People's Republic of China in counterpart Chinese Application No. 201080061434.2.
Communication dated Aug. 5, 2014, issued by the Japanese Patent Office in counterpart Japanese Application No. 2012-538768.
Communication dated Aug. 19, 2014, issued by the Japanese Patent Office in counterpart Japanese Application No. 2012-543023.
Communication dated Sep. 24, 2014, issued by the Japanese Patent Office in counterpart Japanese Application No. 2012-553824.
Communication dated May 22, 2014 issued by the European Patent Office in counterpart European Application No. 11790033.2.
Communication dated Jul. 2, 2014 issued by the State Intellectual Property Office of P.R. China in counterpart Chinese Application No. 201080061417.9.
Communication dated Jul. 3, 2014 issued by the State Intellectual Property Office of P.R. China in counterpart Chinese Application No. 201180010793.X.
Communication dated Jul. 1, 2014 issued by the Japanese Patent Office in counterpart Japanese Application No. 2012-538764.
Communication dated Jul. 15, 2014 issued by the Japanese Patent Office in counterpart Japanese Application No. 2012-538765.
Communication from the Japanese Patent Office dated Mar. 23, 2015 in a counterpart Japanese application No. 2012-553824.
Communication from the State Intellectual Property Office of P.R. China dated Mar. 17, 2015 in a counterpart application No. 201080061417.9.
Communication from the Japanese Patent Office dated Apr. 13, 2015 in a counterpart Japanese application No. 2012-538771.
Communication from the Japanese Patent Office dated Feb. 2, 2015 in a counterpart Japanese application No. 2012-538765.
Communication from the Japanese Patent Office dated Apr. 6, 2015 in a counterpart Japanese application No. 2012-538764.
Communication dated Mar. 24, 2015 issued by European Patent Office in counterpart European Application No. 11756585.3.
Communication dated Apr. 27, 2015 issued by the Japanese Patent Office in counterpart Japanese Patent Application No. 2012-538768.
"Transparent End-to-End Packet-Switched Streaming Service (PSS); Protocols and Codecs (Release 9)", 3GPP TS 26.234, Mar. 2012, 188 pages total.
"Release 2 Specification HTTP Adaptive Streaming", Open IPTV Forum, Sep. 2010, 25 pages total.
Communication dated Nov. 3, 2014, issued by the State Intellectual Property Office of the People's Republic of China in counterpart Chinese Application No. 201180014696.8.
Communication dated Dec. 19, 2014, issued by the Japanese Patent Office in counterpart Japanese Application No. 2012-543023.
Communication dated May 18, 2015, issued by the State Intellectual Property Office of the People's Republic of China in counterpart Chinese Application No. 201080061494.4.
Communication dated Jul. 9, 2015, issued by the State Intellectual Property Office of P.R. China in counterpart Chinese Application No. 201180014696.8.
Communication dated Aug. 13, 2015, issued by the State Intellectual Property Office of P.R. China in counterpart Chinese Application No. 201080061417.9.
Communication dated Aug. 5, 2015, issued by the State Intellectual Property Office of P.R. China in counterpart Chinese Application No. 201180027573.8.
Communication from the State Intellectual Property Office of P.R. China dated Dec. 4, 2015 in a counterpart Chinese application No. 201080061494.4.
Chen, et al., "Response to the CfP on HTTP Streaming: Adaptive Video Streaming based on AVC", International Organization for Standardisation, MPEG Meeting, Jul. 26, 2010-Jul. 30, 2010, Issue No. M17909, pp. 1-20, Geneva, Switzerland, XP030046499.
Communication issued Apr. 1, 2016, issued by the State Intellectual Property Office of the People's Republic of China in counterpart Chinese Patent Application No. 201180027573.8.
Communication issued Apr. 25, 2016, issued by the European Patent Office in counterpart European Patent Application No. 10830204.3.
Communication issued May 9, 2016, issued by the European Patent Office in counterpart European Patent Application No. 11790033.2.
S. Bradner, "Key words for use in RFCs to Indicate Requirement Levels", Network Working Group, Harvard University, Mar. 1997, Total 3 pages, URL: https://www.ietf.org/rfc/rfc2119.txt.
"Digital Video Broadcasting (DVB); Specification for the use of Video and Audio Coding in Broadcasting Applications based on the MPEG-2 Transport Stream", EBU-UER, ETSI TS 101 154 V1.9.1, Sep. 2009, Total 163 pages.
"Digital Video Broadcasting (DVB); Transport of MPEG-2 TS Based DVB Services over IP Based Networks", EBU-UER, ETSI TS 102 034 V1.3.1, Oct. 2007, Total 128 pages.
"Information technology—Generic coding of moving pictures and associated audio information: systems", International Telecommunication Union, Telecommunication Standardization Sector of ITU, Transport of AVC video data over Recommendation H.222.0 (2000)—Amendment 3 (Mar. 2004), ISO/IEC 13818-1 streams, Total 28 pages.
"Information technology—Coding of audio-visual objects—Part 12: ISO base media file format", International Standard, ISO/IEC 14496-12:2005(E), Total 94 pages, Oct. 1, 2005.
"Information technology—Coding of audio-visual objects—Part 14: MP4 file format", International Standard, ISO/IEC 14496-14:2003(E), Total 18 pages, Nov. 15, 2003.
"Information technology—Coding of audio-visual objects—Part 15: Advanced Video Coding (AVC) file format", International Standard, ISO/IEC 14496-15:2004(E), Total 29 pages, Apr. 15, 2004.
Thomas Wiegand et al., "Editing state of text relating to ITU-T Rec. H.264 | ISO/IEC 14496-10 Amendments 1 and 2—Advanced video coding for generic audiovisual services", Series H: Audiovisual and Multimedia Systems, Infrastructure of audiovisual services—Coding of moving video, Total 385 pages, Mar. 2005.
"Information technology—Generic coding of moving pictures and associated audio information—Part 2: Video", International Standard, ISO/IEC 13818-2:2013(E), Total 13 pages, Oct. 1, 2013.
"Digital Video Broadcasting (DVB); Subtitling systems", EBU-UER, ETSI EN 300 743 V1.3.1, Nov. 2006, Total 51 pages.
"Digital Video Broadcasting (DVB); Specification for conveying ITU-R System B Teletext in DVB bitstreams", EBU-UER, ETSI EN 300 472 V1.3.1, May 2003, Total 11 pages.
"Information technology—Coding of audio-visual objects—Part 3: Audio", International Standard, ISO/IEC 14496-3:2009(E), Total 18 pages, Sep. 1, 2009.
"Digital Audio Compression (AC-3, Enhanced AC-3) Standard", EBU-UER, ETSI TS 102 366 V1.2.1, Aug. 2008, Total 214 pages.
"Information Technology—Digital Compression and Coding of Continuous-Tone Still Images—Requirements and Guidelines", International Telecommunication Union, The International Telegraph and Telephone Consultative Committee (CCITT), Recommendation T.81, Sep. 1992, Total 186 pages.
"Information technology—Coding of audio-visual objects—Part 2: Visual", International Standard, ISO/IEC 14496-2:2004(E), Total 19 pages, Jun. 1, 2004.
"Universal Mobile Telecommunications System (UMTS); LTE; Transparent end-to-end Packet-switched Streaming Service (PSS); Protocols and codecs", ETSI TS 126 234 V9.7.0, Jan. 2012, 3GPP TS 26.234 version 9.7.0 Release 9, Total 191 pages.
"Digital cellular telecommunications system (Phase 2+); Universal Mobile Telecommunications System (UMTS); LTE; Transparent end-to-end packet switchedstreaming service (PSS); 3GPP file format (3GP)", ETSI TS 126 244 V9.0.0, Jan. 2010, 3GPP TS 26.244 version 9.0.0 Release 9, Total 54 pages.
Communication dated Jan. 19, 2017, issued by the Korean Intellectual Property Office in counterpart Korean Patent Application No. 10-2010-0103725.

(56) References Cited

OTHER PUBLICATIONS

Communication dated Jan. 30, 2017, issued by the Japanese Patent Office in counterpart Japanese Patent Application No. 2015-146132.
Communication dated Feb. 21, 2017, issued by the Korean Intellectual Property Office in counterpart Korean Patent Application No. 10-2010-0103698.
Communication dated Mar. 15, 2017, issued by the Korean Intellectual Property Office in counterpart Korean Patent Application No. 10-2011-0011110.
Communication dated Mar. 28, 2017, issued by the State Intellectual Property Office of the People's Republic of China in counterpart Chinese Patent Application No. 201080061494.4.
Anonymous, "OIPF Release 1 Specification vol. 2—Media Formats V 1.1" Open IPTV Forum, Oct. 8, 2009, 22 pages total.
Anonymous, "Open IPTV Forum—Functional Architecture—V 1.1" Open IPTV Forum, Jan. 15, 2008, 141 pages total.
Anonymous, "OIPF Release 1 Specification vol. 3—Content Metadata V 1.1", Open IPTV Forum, Oct. 8, 2009, 47 pages total.
Communication dated Oct. 3, 2016, issued by the Japanese Patent Office in counterpart Japanese Patent Application No. 2012-553824.
Communication dated Oct. 31, 2016, issued by the Korean Intellectual Property Office in counterpart Korean Patent Application No. 10-2010-0103721.
Communication dated Oct. 31, 2016, issued by the Korean Intellectual Property Office in counterpart Korean Patent Application No. 10-2010-0103722.
Communication dated Nov. 7, 2016, issued by the Japanese Patent Office in counterpart Japanese Patent Application No. 2015-167763.
Communication dated Dec. 19, 2016, issued by the Japanese Patent Office in counterpart Japanese Patent Application No. 2015-156368.
Alex Zambelli, "IIS Smooth Streaming Technical Overview", Microsoft Corporation, Mar. 2009, pp. 1-17.
Communication dated Jul. 15, 2016, issued by the Korean Intellectual Property Office in counterpart Korean application No. 10-2010-0103727.
Communication dated Aug. 15, 2016, issued by the Japanese Patent Office in counterpart Japanese application No. 2015-156368.
Communication dated Sep. 12, 2016, issued by the Japanese Patent Office in counterpart Japanese application No. 2012-538764.
Communication dated Aug. 1, 2016, issued by the State Intellectual Property Office of P.R. China in counterpart Chinese application No. 201080061494.4.
Communication dated Aug. 29, 2016, issued by the Japanese Patent Office in counterpart Japanese application No. 2015-159842.
Communication dated Aug. 29, 2016, issued by the Japanese Patent Office in counterpart Japanese application No. 2012-538771.
Qualcomm Incorporated, et al., "3GPP Adaptive HTTP Streaming", Proposal to MPEG HTTP Streaming, 93rd MPEG meeting, Geneva, XP030001643, Jul. 22, 2010, pp. 1-61.
Qualcomm Incorporated, "Adaptive HTTPStreaming: Usage of the 3GPP File Format", 3GPP TSG-SA4 AHI Meeting, SA-AHI172, Mar. 2-4, 2010, Aachen, Germany, XP050437444, pp. 1-8.
Communication dated Sep. 29, 2016, issued by the European Patent Office in counterpart European Application No. 11747701.8.
Qualcomm Incorporated, "Pseudo CR: Adaptive HTTP Streaming—Full Solution", 3GPP TSG-SA4 #57, S4-100060, Jan. 25-29, 2010, St Julians, Malta, UR:http://www.3gpp.org/ftp/tsg_sa/WG4_CODEC/TSGS4_57/Docs/S4-100060.zip, total 17 pages.
Communication dated Sep. 26, 2016, issued by the Japanese Patent Office in counterpart Japanese application No. 2015-146132.
Huawei Technologies Co., Ltd., "Live Content Support in Static HTTP Streaming", 3GPP TSG-SA4 #56, S4-090857, Nov. 9-13, 2009, Sophia-Antipolis, URL:http://www.3gpp.org/ftp/tsg_sa/WG4_CODEC/TSGS4_56/Docs/S4-090857.zip France, total 6 pages.

* cited by examiner

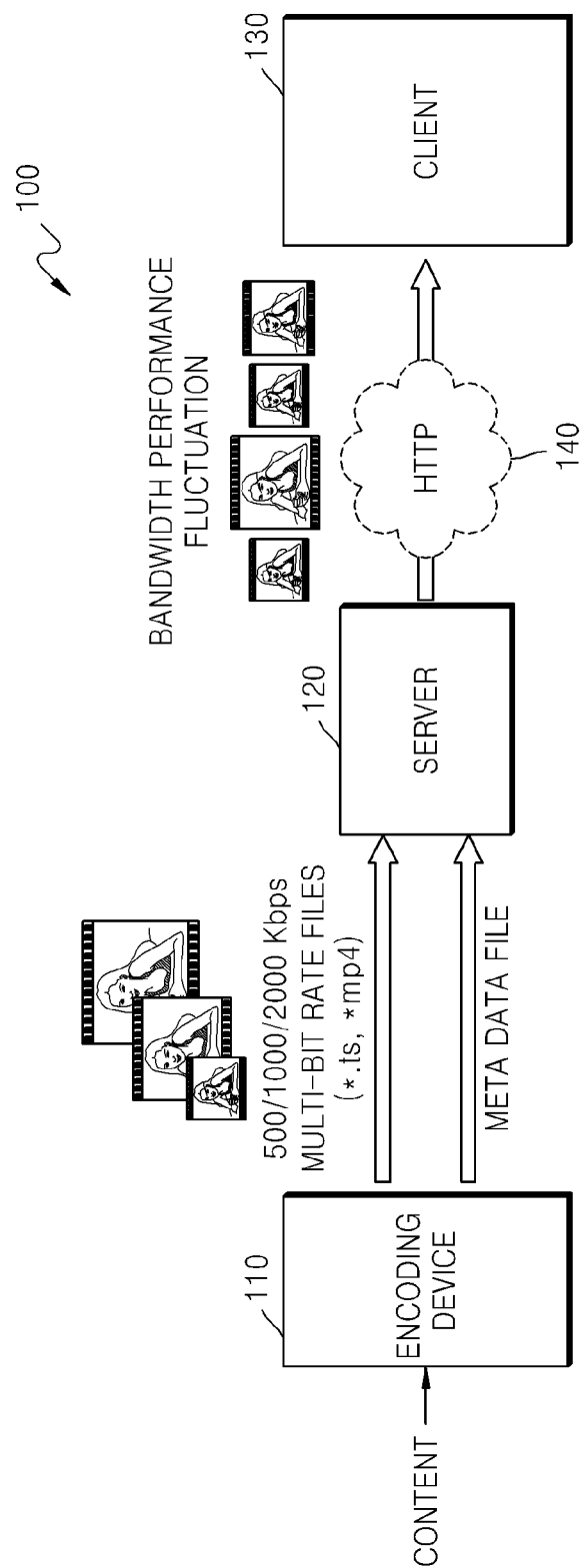

FIG. 4A

```
<Tracks>
    <Track ID="1" Type="Packed" BitRate="200000">
    <Track ID="2" Type="Video" BitRate="400000">
</Tracks>
```

FIG. 4B

```
<RefData Type="HEAD-TS" ID="1">
      <URL>http://www.altova.com/movie1/head1.ref</URL>
</RefData>
<RefData Type="HEAD-TS" ID="2">
      <URL>http://www.altova.com/movie1/head2.ref</URL>
</RefData>
```

FIG. 4C

```
<Fragments NextFragmentsXMLURL="http://www.altova.com/movie1/NextMeta.xml">
     <Fragment StartTime="14:20:00.0Z' Duration="00:00:02.0z" ID="1"
BitRate="200000">
            <URL>http://www.altova.com/movie1/slice1-1.as</URL>
            <RefPointer>1</RefPointer>
     <Fragment StartTime="14:20:00.0Z' Duration="00:00:02.0z" ID="1"
BitRate="400000">
            <URL>http://www.altova.com/movie1/slice2-1.as</URL>
            <RefPointer>2</RefPointer>
</Fragments>
```

FIG. 7

```
<ContentItem>
    <Title xml:lang="en-us">Example</Title>
    <Synopsis xml:lang="en-us">String</Synopsis>
    <OriginSite>http://asexample.com</OriginSite>
    <OriginStateName>Example</OriginSiteName>
    <ContentID>18888</ContentID>
    <ContentURL VideoCoding="AVC" Duration="14:20:00.00" Size="0" MediaFormat="MP4" DRMSystemID="12" MD5Hash=
    "String" MIMIType="video/MP4"TransferType="AS-CoD" AudioCoding="AAC">http://asexample.com/vod/movies/18888/
    Meta/MainMeta.xml</ContentURL>
    </Contestltem>
</Contents>
```

FIG. 9A

```xml
<AdaptiveControl xsi:noNamespaceSchemaLocation="samsung_as.xsd" xmlns:xsi="http://www.w3.org/2001/XMLSchema-instance' >
    <URL Template>http://asexample.com/vod/movies/18888/Tracks/Seg{TrackID}-{SegmentID}.as</URLTemplate>
    <RefDataURL>http://asexample.com/vod/movies/18888/References/header2.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Audio" Bitrate="64000" StartTime="00:00:00" SegmentDuration="00:00:30" SegmentStartID="1000" SegmentCount="120"/>
    <Track ID="5" Type="I-Frame" Bitrate="500000" StartTime="00:00:00" SegmentDuration="00:00:10" SegmentStartID="1000" SegmentCount="360"/>
</AdaptiveControl>
```

FIG. 9B

```xml
<AdaptiveControl xsi:noNamespaceSchemaLocation="samsung_as.xsd" xmlns:xsi="http://www.w3.org/2001/XMLSchema-instance' >
    <URL Template>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:00:00" SegmentDuration="00:00:06" SegmentStartID="1000" SegmentCount="10"/>
    <Track ID="2" Type="Video" Bitrate="1000000" StartTime="10:00:00" SegmentDuration="00:00:06" SegmentStartID="1000" SegmentCount="10"/>
    <Track ID="3" Type="Video" Bitrate="2000000" StartTime="10:00:00" SegmentDuration="00:00:06" SegmentStartID="1000" SegmentCount="10"/>
    <Track ID="4" Type="Audio" Bitrate="64000" StartTime="10:00:00" SegmentDuration="00:00:30" SegmentStartID="1000" SegmentCount="2"/>
</AdaptiveControl>
```

FIG. 9C

```xml
<AdaptiveControl xsi:noNamespaceSchemaLocation="samsung_as.xsd" xmlns:xsi="http://www.w3.org/2001/XMLSchema-instance" >
    <URLTemplate>http://asexample.com/vod/movies/18888/Tracks/Seg{TrackID}-{SegmentID}.as</URLTemplate>
    <NextAdaptiveControlURL>http://asexample.com/live/movies/18888/Meta/NextMeta.xml</NextAdaptiveControlURL>
    <RefDataURL>http://asexample.com/vod/movies/18888/References/header.ref</RefDataURL>
    <Track ID="1" Type="Video" Bitrate="500000" StartTime="10:01:00" SegmentDuration="00:00:06" SegmentStartID="1010" SegmentCount="10"/>
    <Track ID="2" Type="Video" Bitrate="1000000" StartTime="10:01:00" SegmentDuration="00:00:06" SegmentStartID="1010" SegmentCount="10"/>
    <Track ID="3" Type="Video" Bitrate="2000000" StartTime="10:01:00" SegmentDuration="00:00:06" SegmentStartID="1010" SegmentCount="10"/>
    <Track ID="4" Type="Audio" Bitrate="64000" StartTime="10:01:00" SegmentDuration="00:00:30" SegmentStartID="1010" SegmentCount="2"/>
</AdaptiveControl>
```

FIG. 9D

```xml
<AdaptiveControl xsi:noNamespaceSchemaLocation="samsung_as.xsd" xmlns:xsi="http://www.w3.org/2001/XMLSchema-instance" >
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="360"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9E

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:00:00" SegmentDuration="00:00:10" SegmentStartID="1000" SegmentCount="360"/>
    <Track ID="3" Type="Video" Bitrate="2000000" StartTime="00:00:00" SegmentDuration="00:00:10" SegmentStartID="1000" SegmentCount="360"/>
    <Track ID="4" Type="Video" Bitrate="3000000" StartTime="00:00:00" SegmentDuration="00:00:10" SegmentStartID="1000" SegmentCount="360"/>
    <Track ID="5" Type="Video" Bitrate="4000000" StartTime="00:00:00" SegmentDuration="00:00:10" SegmentStartID="1000" SegmentCount="60"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9F

```
<AdaptiveControl xsi:noNamespaceSchemaLocation="samsung_as.xsd" xmlns:xsi="http://www.w3.org/2001/XMLSchema-instance">
    <URLTemplate>http://asexample.com/vod/movies/18888/Tracks/Seg{TrackID}-{SegmentID}.as</URLTemplate>
    <RefDataURL>http://asexample.com/vod/movies/18888/References/header.ref</RefDataURL>
    <Track ID="1" Type="Video" Bitrate="500000" StartTime="00:00:00" SegmentDuration="00:00:10" SegmentStartID="1000" SegmentCount="360"/>
    <Track ID="2" Type="Video" Bitrate="1000000" StartTime="00:02:00" SegmentDuration="00:00:10" SegmentStartID="1000" SegmentCount="348"/>
    <Track ID="3" Type="Video" Bitrate="2000000" StartTime="00:02:00" SegmentDuration="00:00:10" SegmentStartID="1000" SegmentCount="348"/>
    <Track ID="4" Type="Video" Bitrate="3000000" StartTime="00:02:00" SegmentDuration="00:00:10" SegmentStartID="1000" SegmentCount="348"/>
    <Track ID="5" Type="Video" Bitrate="4000000" StartTime="00:02:00" SegmentDuration="00:00:10" SegmentStartID="1000" SegmentCount="348"/>
    <Track ID="6" Type="Audio" Bitrate="64000" StartTime="00:00:00" SegmentDuration="00:00:30" SegmentStartID="1000" SegmentCount="120"/>
</AdaptiveControl>
```

FIG. 9G

```xml
<AdaptiveControl xsi:noNamespaceSchemaLocation="samsung_as.xsd" xmlns:xsi="http://www.w3.org/2001/XMLSchema-instance">
  <NextAdaptiveControlURL>http://asexample.com/live/movies/18888/Meta/NextMeta.xml</NextAdaptiveControlURL>
  <Track ID="1" Type="Packed" BitRate="500000">
    <Segment StartTime="00:00:00.00" Duration="00:02:00.00" ID="1000">
      <URL>http://ad_server.com/ad_for_adaptive/ad1.ts</URL>
    </Segment>
  </Track>
</AdaptiveControl>
```

FIG. 9H

```xml
<AdaptiveControl xsi:noNamespaceSchemaLocation="samsung_as.xsd" xmlns:xsi="http://www.w3.org/2001/XMLSchema-instance">
  <URL Template>http://asexample.com/vod/movies/18888/Tracks/Seg{TrackID}-{SegmentID}.as</URLTemplate>
  <NextAdaptiveControlURL>http://asexample.com/live/movies/18888/Meta/NextMeta.xml</NextAdaptiveControlURL>
  <RefDataURL>http://asexample.com/vod/movies/18888/References/header.ref</RefDataURL>
  <Track ID="1" Type="Video" Bitrate="500000" StartTime="10:00:00" SegmentDuration="00:00:06" SegmentStartID="1000" SegmentCount="10"/>
  <Track ID="2" Type="Video" Bitrate="1000000" StartTime="10:00:00" SegmentDuration="00:00:06" SegmentStartID="1000" SegmentCount="10"/>
  <Track ID="3" Type="Video" Bitrate="2000000" StartTime="10:00:00" SegmentDuration="00:00:06" SegmentStartID="1000" SegmentCount="10"/>
  <Track ID="4" Type="Audio" language="EN" Bitrate="64000" StartTime="10:00:00" SegmentDuration="00:00:30" SegmentStartID="1000" SegmentCount="2"/>
  <Track ID="5" Type="Audio" language="KR" Bitrate="64000" StartTime="10:00:00" SegmentDuration="00:00:30" SegmentStartID="1000" SegmentCount="2"/>
  <Track ID="6" Type="Subtitle" language="EN" Bitrate="0" StartTime="0" StartTime="10:00:00" SegmentDuration="00:00:30" SegmentStartID="1000" SegmentCount="2"/>
  <Track ID="7" Type="Subtitle" language="KR" Bitrate="0" StartTime="0" StartTime="10:00:00" SegmentDuration="00:00:30" SegmentStartID="1000" SegmentCount="2"/>
</AdaptiveControl>
```

US 9,967,598 B2

ADAPTIVE STREAMING METHOD AND APPARATUS

CROSS-REFERENCE TO RELATED PATENT APPLICATIONS

This application claims priorities from U.S. Provisional Application No. 61/260,906, filed on Nov. 13, 2009, U.S. Provisional Application No. 61/262,708, filed on Nov. 19, 2009, U.S. Provisional Application No. 61/267,131, filed on Dec. 7, 2009, U.S. Provisional Application No. 61/294,211, filed on Jan. 12, 2010, U.S. Provisional Application No. 61/303,778, filed on Feb. 12, 2010, U.S. Provisional Application No. 61/380,489, filed on Sep. 7, 2010, U.S. Provisional Application No. 61/380,461, filed on Sep. 7, 2010, in the U.S. Patents and Trademark Office, and Korean Patent Application No. 10-2010-0103722, filed on Oct. 22, 2010, in the Korean Intellectual Property Office, the disclosures of which are incorporated herein in their entireties by reference.

BACKGROUND

1. Field

Exemplary embodiments relate to a streaming method and apparatus, and more particularly, to a method and apparatus for adaptively streaming media data according to fluctuations in a streaming environment.

2. Description of the Related Art

Examples of a method of transmitting media data through a network include a downloading method and a streaming method. In the streaming method, a server transmits media data in real time, and a client reproduces the received media data in real time.

Unlike the downloading method that starts to reproduce media data after transmitting and receiving the media data, since the streaming method transmits and receives the media data through a logical channel set between the server and the client, and reproduces the media data in real time, a method and apparatus for maintaining quality of service (QoS) in reproducing the media data by reflecting fluctuations in a streaming environment are required.

SUMMARY

An exemplary embodiment provides a method and apparatus for adaptively adjusting and performing streaming, i.e., for adaptively transmitting and receiving media data according to a streaming environment.

An exemplary embodiment also provides a computer readable recording medium having recorded thereon a program for executing the methods described herein.

According to an aspect of an exemplary embodiment, there is provided a method of receiving media data, the method including: receiving a first file including information about predetermined content from a server; receiving a second file including information about a plurality of media data generated by encoding the predetermined content to have different qualities from the server based on the first file; and receiving at least one of the plurality of media data based on the second file, wherein the first file includes information about a location of the second file.

The information about the location of the second file may be uniform resource locator (URL) information of the second file.

The receiving of the second file may include: transmitting a hypertext transfer protocol (HTTP) request message requesting the server to transmit the second file based on the URL information of the second file; and receiving an HTTP response message including the second file from the server in response to the HTTP request message.

Each one of the plurality of media data may include at least one of a plurality of data segments generated by encoding the content to have a predetermined quality and dividing the content based on time.

The second file may include at least one of information about a template relating to URLs of the plurality of data segments, and information about at least one of formats of the plurality of media data.

The second file may further include information pointing to a header of the plurality of media data.

The plurality of media data may respectively correspond to a plurality of elementary streams, and the header of the plurality of media data may include at least one of a program association table (PAT) and a program map table (PMT) about the plurality of elementary streams.

The at least one of the PAT and the PMT may include an entire list of the plurality of media data.

Packet identifiers (PIDs) of the plurality of media data may be different from each other.

The at least one data segment may include at least one packetized elementary stream (PES).

A presentation time stamp (PTS) and a decoding time stamp (DTS) of PESs included in different media data from among the plurality of media data may be aligned according to reproduction time.

The second file may further include information about a third file including information about another plurality of media data generated by encoding following content to be received after the content to have different qualities.

The second file may include information about at least one of a name, a type, a quality, and a time stamp of each one of the plurality of media data.

The second file may differ according to a rating of a user receiving at least one of the plurality of media data.

According to another aspect of an exemplary embodiment, there is provided a method of transmitting media data, the method including: transmitting a first file including information about predetermined content to a client; transmitting a second file including information about a plurality of media data, which are generated by encoding the predetermined content to have different qualities, to the client; and transmitting at least one of the plurality of media data to the client, according to a request of the client based on the second file, wherein the first file includes information about a location of the second file.

According to another aspect of an exemplary embodiment, there is provided an apparatus for receiving media data, the apparatus including: an information receiver for receiving a first file including information about predetermined content from a server, and receiving a second file including information about a plurality of media data generated by encoding the predetermined content to have different qualities from the server based on the first file; and a media data receiver for receiving at least one of the plurality of media data based on the second file, wherein the first file includes information about a location of the second file.

According to another aspect of an exemplary embodiment, there is provided an apparatus for transmitting media data, the apparatus including: an information transmitter for transmitting a first file including information about predetermined content to a client, and transmitting a second file including information about a plurality of media data, which are generated by encoding the predetermined content to have different qualities, to the client; and a media data transmitter for transmitting at least one of the plurality of media data to the client, according to a request of the client based on the second file, wherein the first file includes information about a location of the second file.

According to another aspect of an exemplary embodiment, there is provided a method of receiving media data, the method including: receiving a file including information about a plurality of media data generated by encoding predetermined content to have different qualities from a server; and receiving at least one of the plurality of media data based on the received file, wherein the file includes at least one of a name, a type, a quality, and a time stamp of each one of the plurality of media data.

According to another aspect of an exemplary embodiment, there is provided a method of transmitting media data, the method including: transmitting a file including information about a plurality of media data generated by encoding predetermined content to have different qualities to a client; and transmitting at least one of the plurality of media data to the client according to a request of the client based on the transmitted file, wherein the file includes at least one of a name, a type, a quality, and a time stamp of each one of the plurality of media data.

According to another aspect of an exemplary embodiment, there is provided an apparatus for receiving media data, the apparatus including: an information receiver for receiving a file including information about a plurality of media data generated by encoding predetermined content to have different qualities from a server; and a media data receiver for receiving at least one of the plurality of media data based on the received file, wherein the file includes at least one of a name, a type, a quality, and a time stamp of each one of the plurality of media data.

According to another aspect of an exemplary embodiment, there is provided an apparatus for transmitting media data, the apparatus including: an information transmitter for transmitting a file including information about a plurality of media data generated by encoding predetermined content to have different qualities to a client; and a media data transmitter for transmitting at least one of the plurality of media data to the client according to a request of the client based on the transmitted file, wherein the file includes at least one of a name, a type, a quality, and a time stamp of each one of the plurality of media data.

According to another aspect of an exemplary embodiment, there is provided a computer readable recording medium having recorded thereon a program for executing any one of the above-described methods.

BRIEF DESCRIPTION OF THE DRAWINGS

The above and/or other aspects will become more apparent by describing in detail exemplary embodiments with reference to the attached drawings in which:

FIG. 1 is a diagram of a streaming system according to an exemplary embodiment;

FIG. 4A illustrates information for defining a plurality of media data, according to an exemplary embodiment;

FIG. 4B illustrates information about a header of media data, according to an exemplary embodiment;

FIG. 4C illustrates information about at least one segment included in each one of a plurality of media data, according to an exemplary embodiment;

FIG. 7 illustrates information about content according to an exemplary embodiment;

FIGS. 9A, 9B, 9C, 9D, 9E, 9F, 9G and 9H illustrate media presentation descriptions according to exemplary embodiments;

DETAILED DESCRIPTION OF EXEMPLARY EMBODIMENTS

Figure 2A:
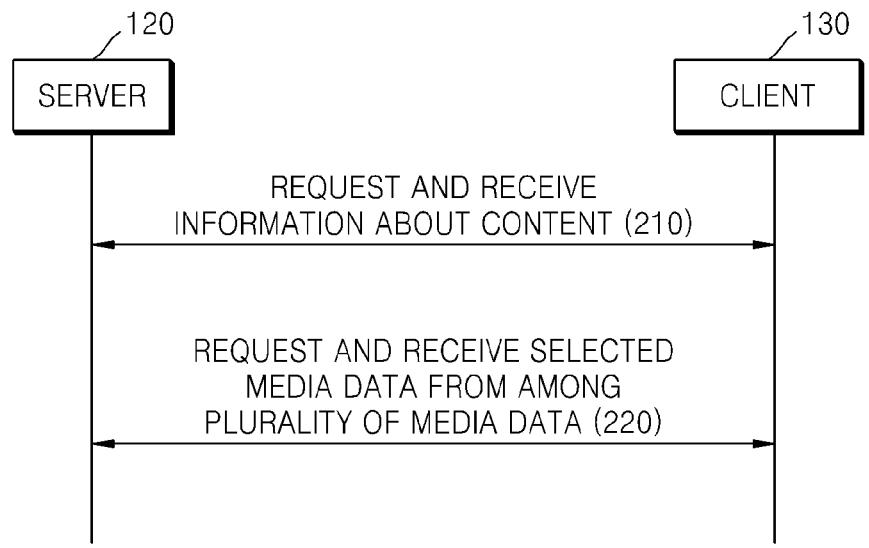
FIGS. 2A and 2B are flowcharts for describing streaming methods according to exemplary embodiments.

Hereinafter, exemplary embodiments will be described more fully with reference to the accompanying drawings, in which exemplary embodiments are shown. Expressions such as "at least one of," when preceding a list of elements, modify the entire list of elements and do not modify the individual elements of the list.

FIG. 1 is a diagram of a streaming system 100 according to an exemplary embodiment.

Referring to FIG. 1, the streaming system 100 according to the present exemplary embodiment includes an encoding device 110, a server 120, and a client 130.

The encoding device 110 generates a plurality of media data about one input content by encoding the input content to have a plurality of different qualities. A streaming environment may change when the server 120 streams media data to the client 130. For example, a bandwidth of a network 140 for streaming may be changed, or a hardware source that may be used by the server 120 to transmit media data or by the client 130 to receive media data may be changed.

Accordingly, the encoding device 110 encodes one content to have different qualities for adaptive streaming according to a fluidic streaming environment. One content may be encoded to have different qualities by adjusting a factor, such as a bit rate, a sampling frequency, resolution, or a frame rate. For example, a plurality of media data in 500 Kbps, 1000 Kbps, and 2000 Kbps may be generated by encoding one image content in different resolutions.

The plurality of media data in different qualities are transmitted to the server 120, and at this time, information about the content and information about each media data may also be transmitted to the server 120. The information about the content may include, but is not limited to, information about a title, a synopsis, a content identifier (ID), and a content uniform resource locator (URL) of the content as metadata of the content. The information about each media data may include a quality, a type, an ID, or the like of each media data, and will be described in detail with reference to FIGS. 4A, 4B and 4C.

The client 130 receives at least one of the information about content and information about each media data, and requests the server 120 for at least one of the plurality of media data, based on the received at least one of the information about content and information about each media data. The client 130 estimates a streaming environment, and selects at least one of the plurality of media data based on the estimated streaming environment. The at least one media data that may maintain a suitable quality of service (QoS) in the estimated streaming environment may be selected. Then, the client 130 may transmit a hypertext transfer protocol (HTTP) request for requesting the server 120 to transmit the selected at least one media data.

When a streaming environment is deteriorated and high quality media data is received but continuous reproduction of media data is not possible, low quality media data may be requested from among a plurality of media data. When a streaming environment is improved and high quality media data is received and continuous reproduction of media data is possible, the high quality media data may continue to be requested from among a plurality of media data.

The client 130 may request the server 120 to transmit another media data while receiving a predetermined media data. For example, the client 130, which requested and was receiving first media data that is of low quality in a deteriorated streaming environment, may request the server 120 to transmit second media data that is of a higher quality than the first media data as the streaming environment improves. According to a conventional streaming method, when the server 120 and the client 130 sets a quality while initially setting a streaming channel, media data is continuously transmitted and received having the same quality. However, according to the present exemplary embodiment, streaming that is adaptive to the streaming environment is possible since the client 130 is able to request the second media data again even while receiving the first media data about the same content.

The client 130 may estimate a streaming environment by using any method of estimating a streaming environment based on the bandwidth of the network 140 or the hardware resource that may be used by the server 120 or the client 130. For example, the client 130 may estimate the streaming environment based on a time stamp and a bit error rate (BER) of received media data. The streaming environment may be determined to be deteriorated when media data is received slower than a reproduction speed by checking time stamps of the received media data. Alternatively, the streaming environment may be determined to be deteriorated when BERs of the received media data are increased.

When the client 130 requests the server 120 to transmit at least one of the media data according to the streaming environment, the server 120 transmits requested media data to the client 130. The server 120 may transmit the requested media data to the client 130 as an HTTP response to the HTTP request.

Each media data may include at least one of a plurality of segments generated by encoding content in different qualities and dividing the encoded content. In other words, each media data generated by encoding the content by the encoding device 110 may include at least one segment divided based on time. The server 120 transmits the content by dividing the content into the plurality of segments and respectively transmitting the plurality of segments, instead of encoding the content in one stream and continuously transmitting the content. The plurality of segments may be generated by dividing the content into predetermined time units, such as units of 10 or 20 seconds. The time that is the basis for dividing the content may be set based on a group of pictures (GOP). Media data corresponding to pictures of one or more GOPs may be set as one segment.

For example, when content is streamed having two qualities, the first media data may include at least one segment generated by encoding the content to have a first quality and dividing the encoded content based on time, and the second media data may include at least one segment generated by encoding the content to have a second quality and dividing the encoded content based on time.

The adaptive streaming is possible by dividing each media data based on time. For example, when streaming starts, the server 120 transmits a segment corresponding to 0 to 20 seconds of the first media data that is of low quality. Then, when it is determined that the streaming environment is improved after 20 seconds and the client 130 requests media data that is of higher quality, the server 120 may transmit a segment corresponding to 20 to 40 seconds of the second media data that is of the higher quality. Since media data is divided into a plurality of segments based on time, segments of different media data may be transmitted according to a streaming environment, even during streaming.

FIG. 2A is a flowchart for describing a streaming method according to an exemplary embodiment.

Referring to FIG. 2A, the client 130 transmits a request to the server 120 to transmit information about predetermined content, in operation 210. When a user of the client 130 selects the predetermined content from a user interface displayed on a screen of the client 130, the client 130 requests the server 120 to transmit information about the selected content. The client 130 may transmit an HTTP request requesting the server 120 to transmit information about predetermined content.

Upon receiving the request from the client 130, the server 120 transmits the information about the predetermined content to the client 130. The server 120 may transmit the information about the predetermined content as an HTTP response to the HTTP request to the client 130. The information about the predetermined content may be a content access descriptor (CAD) according to an open IPTV forum (OIPF) standard. The information about the predetermined content will now be described in detail with reference to FIG. 3.

Figure 3:
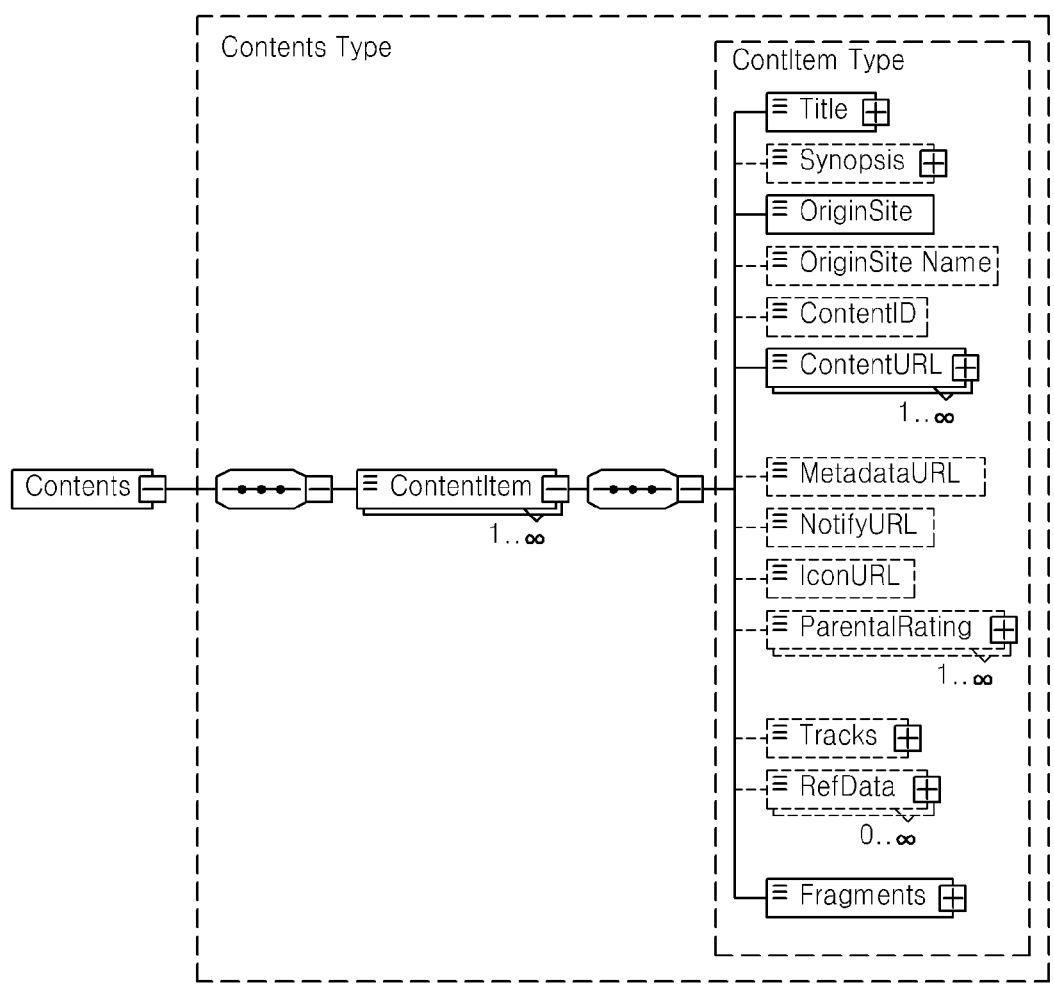
FIG. 3 is a schema of a file including information about content, according to an exemplary embodiment.

FIG. 3 is a schema of a file including information about content, according to an exemplary embodiment. The file may be a CAD, and may be an eXtensible Markup Language (XML) file. A tag and an attribute are separately described, but it is understood that according to an exemplary embodiment an item defined by a tag can be defined by an attribute or an item defined by an attribute can be defined by a tag.

Referring to FIG. 3, the information about content may include "Title", "Synopsis", "OriginSite", and "ContentURL" tags.

Since conventional streaming of media data generates one media data by encoding one content to have a predetermined quality, conventional information (specifically, CAD according to OIPF) about content does not include information about a plurality of media data generated by encoding the content to have different qualities.

However, the information about content, according to the present exemplary embodiment, includes information about a plurality of media data generated by encoding one content to have different qualities, and corresponds to "Tracks", "RefData", and "Fragments" tags in FIG. 3.

FIG. 4A illustrates information for defining a plurality of media data, according to an exemplary embodiment.

Referring to FIG. 4A, a "Tracks" tag is information for classifying a plurality of media data generated by encoding content to have different qualities. The "Tracks" tag includes an "ID" attribute, a "Type" attribute, and a "BitRate" attribute assigned to each media data.

The "ID" attribute defines identifiers sequentially given to the plurality of media data, and the "Type" attribute defines whether media data corresponds to audio data, video data, video/audio data, or subtitle data. When the "Type" attribute is "Packed", the media data is video/audio data, and when the "Type" attribute is "Video", the media data is video data. The "BitRate" attribute defines a bit rate used to encode the media data.

FIG. 4B illustrates information about a header of media data, according to an exemplary embodiment.

Referring to FIG. 4B, a "RefData" tag includes a "Type" attribute and an "ID" attribute. The "Type" attribute defines a media format of a header. For example, when the "Type" attribute is "HEAD-TS", the header is a header of a transport stream format. The "ID" attribute defines a media data of a header. When the "ID" attribute is "1", the header is a header of media data having a media data ID of "1". Also, the "RefData" tag includes information pointing to a header, and an "URL" tag defines a location of a header, i.e., a URL of a header.

The "RefData" tag is a selective element. The "RefData" tag is included in information about content only when a header is separated from media data and exists as a separate file, and may not be included in the information about content when the header is combined with the media data.

FIG. 4C illustrates information about at least one segment included in each of a plurality of media data, according to an exemplary embodiment.

Referring to FIG. 4C, a "Fragment" tag, which is a sub tag of a "Fragments" tag, includes the information about at least one segment included in each of the plurality of media data.

The "Fragments" tag includes a "NextFragmentsXMLURL" attribute. When following content is continuously streamed after streaming of one content is completed like in the case of live streaming, the following content may be seamlessly streamed only when the client 130 is aware of information about the following content. Accordingly, the "Fragments" tag defines the information about the following content as the "NextFragmentsXMLURL" attribute. URLs of the plurality of media data with respect to the following content may be defined as the "NextFragmentsXMLURL" attribute.

The "Fragment" tag includes information about at least one segment of current content. Referring to FIG. 4C, URL information of "slice1-1.as" constituting a first segment generated by encoding content in a first quality as first media data is defined by a "URL" tag, and an ID of a corresponding header is defined by a "RefPointer" tag. Also, a starting time of the first segment is defined by a "StartTime" attribute, and a duration time of each segment is defined by a "Duration" attribute. A quality of the first media data is defined by a "BitRate" attribute.

In FIG. 4C, the "Fragments" tag shows each media data including only one segment. However, as described above with reference to FIG. 1, it is understood that according to an exemplary embodiment, when each media data is divided into a plurality of segments, one "Fragments" tag may include information about at least two segments.

Referring back to FIG. 2A, the client 130 requests the server 120 to transmit at least one of the plurality of media data, in operation 220. The plurality of media data are generated by encoding one content to have different qualities. The client 130 selects at least one media data encoded to have a quality suitable for a streaming environment from among the plurality of media data, and requests the server 120 for the selected at least one media data. The client 130 may transmit an HTTP request to the server 120 based on information about the plurality of media data, which is included in the information about the content.

As described with reference to FIG. 4C, the information about the content may include a "Fragments" tag. Accordingly, the client 130 requests the server 120 to transmit selected media data based on URL information included in the "Fragments" tag.

The server 120 transmits the media data according to the request of the client 130. The server 120 may transmit at least one segment of the requested media data to the client 130. The server 120 may transmit media data requested as an HTTP response with respect to an HTTP request to the client 130.

Figure 2B:
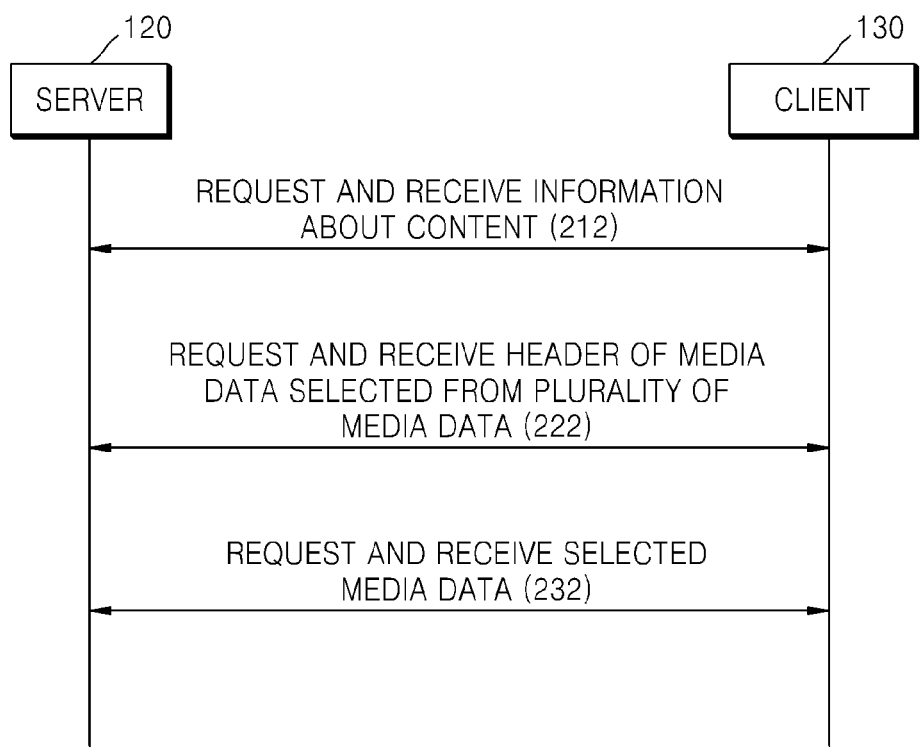

FIG. 2B is a flowchart for describing a streaming method according to another exemplary embodiment. FIG. 2B illustrates the streaming method when a header exists as a separate file from media data.

Referring to FIG. 2B, the client 130 requests the server 120 to transmit information about predetermined content, in operation 212, and the server 120 transmits the information about content. Operation 212 corresponds to operation 210 of FIG. 2A. The information about content including the "RefData" tag described above with reference to FIG. 4B is received.

In operation 222, the client 130 requests a header of selected media data from among a plurality of media data, based on the information about content received in operation 212. At least one media data suitable for a streaming environment is selected from among the plurality of media data based on the information about content received in operation 212, and a header of the selected at least one media data is requested. The header of the selected at least one media data is requested by referring to the "RefData" tag included in the information about content received in operation 212.

The server 120 transmits the requested header to the client 130. A header file may be transmitted to the client 130, and may be an XML file.

In operation 232, the client 130 requests the server 120 to transmit selected media data based on the information about content received in operation 212 and the header received in operation 222. The client 130 requests the server 120 to transmit at least one segment generated by dividing media data based on time, and the server 120 transmits the requested at least one segment to the client 130.

Figure 5A:
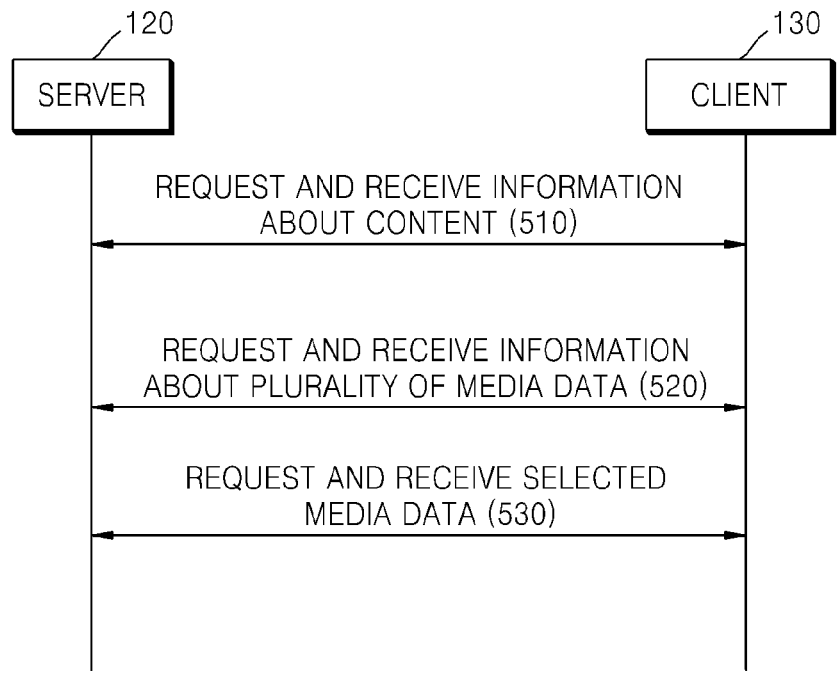
FIGS. 5A and 5B are flowcharts for describing streaming methods according to other exemplary embodiments.

FIG. 5A is a flowchart for describing a streaming method according to another exemplary embodiment.

Referring to FIG. 5A, the client 130 requests the server 120 to transmit information about predetermined content, in operation 510, and the server 120 transmits the information about content. The client 130 transmits an HTTP request for requesting the server 120 to transmit the information about content, and receives the information about content as an HTTP response to the HTTP request. The information about content may be an XML file. The information about content received by the client 130 in operation 510 is different from the information about content received by client 130 in operation 210 of FIG. 2, and the difference will now be described with reference to FIGS. 6 and 7.

Figure 6:
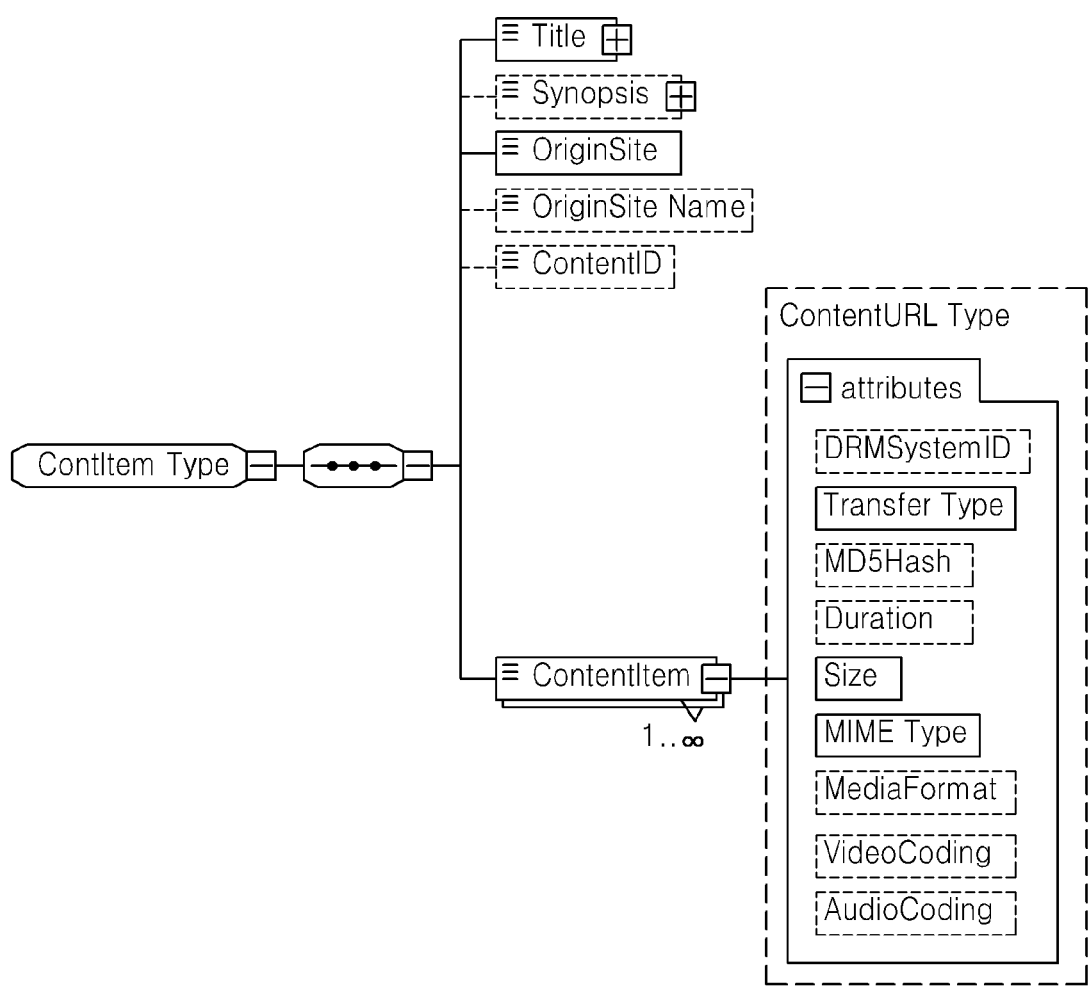
FIG. 6 is a schema of a file including information about content, according to another exemplary embodiment.

FIG. 6 is a schema of a file including information about content, according to another exemplary embodiment.

Referring to FIG. 6, the information about content according to the present exemplary embodiment may include "Title", "Synopsis", "OriginSite", and "ContentURL" tags like FIG. 3.

However, in FIG. 3, the information about content includes the information about the plurality of media data by including the "Tracks", "RefData", and "Fragments" tags, whereas in FIG. 6, instead of including the information about the plurality of media data, the information about content only defines a URL of a file (hereinafter, referred to as a "media presentation description") including the information about the plurality of media data. The "ContentURL" tag may define the URL of the media presentation description.

Compatibility with various media data formats may be maintained while performing streaming that is adaptive to a streaming environment by inserting the URL of the media presentation description into the information about content as shown in FIG. 6, without largely changing conventional schema of the file containing the information about content.

As shown in FIG. 6, the information about content may only include information related to the streaming method, and not include the information about the plurality of media data. In other words, the "ContentURL" tag may include a "MediaFormat" attribute defining a format of media data used during streaming, and a "MIMEType" attribute defining a type of media data.

Specifically, the "ContentURL" tag may include a "TransferType" attribute defining a service to which streaming of content is related. The "TransferType" attribute may define whether the streaming of content is related to a Content on Delivery (CoD) service, a live service, an adaptive streaming live service, or an adaptive streaming CoD service.

FIG. 7 illustrates information about content according to an exemplary embodiment. FIG. 7 may be a CAD according to the OIPF standard.

Referring to FIG. 7, the information about content generated according to the schema of FIG. 6 may define a URL of a media presentation description in a "ContentURL" tag. http://as example.com/vod/movies/18888/Meta/Main-Meta.xml is the URL of the media presentation description. Also, as described with reference to FIG. 6, the "MediaFormat" attribute, the "MIMEType" attribute, and the "TransferType" attribute may be defined in the "ContentURL" tag.

Referring back to FIG. 5A, in operation 520, the client 130 requests the server 120 for the information about the plurality of media data, based on the information about content received in operation 510. The client 130 may request a media presentation description to the server 120 through an HTTP request, and may receive the media presentation description as an HTTP response.

The information about content received by the client 130 from the server 120 in operation 510 may include the URL of the media presentation description as described with reference to FIGS. 6 and 7, and thus the client 130 requests and receives the media presentation description from the server 120 by referring to the "ContentURL" tag of the information about content. The media presentation description will now be described in detail with reference to FIGS. 8A and 8B, and FIGS. 9A, 9B, 9C, 9D, 9E, 9F, 9G and 9H.

Figure 8A:
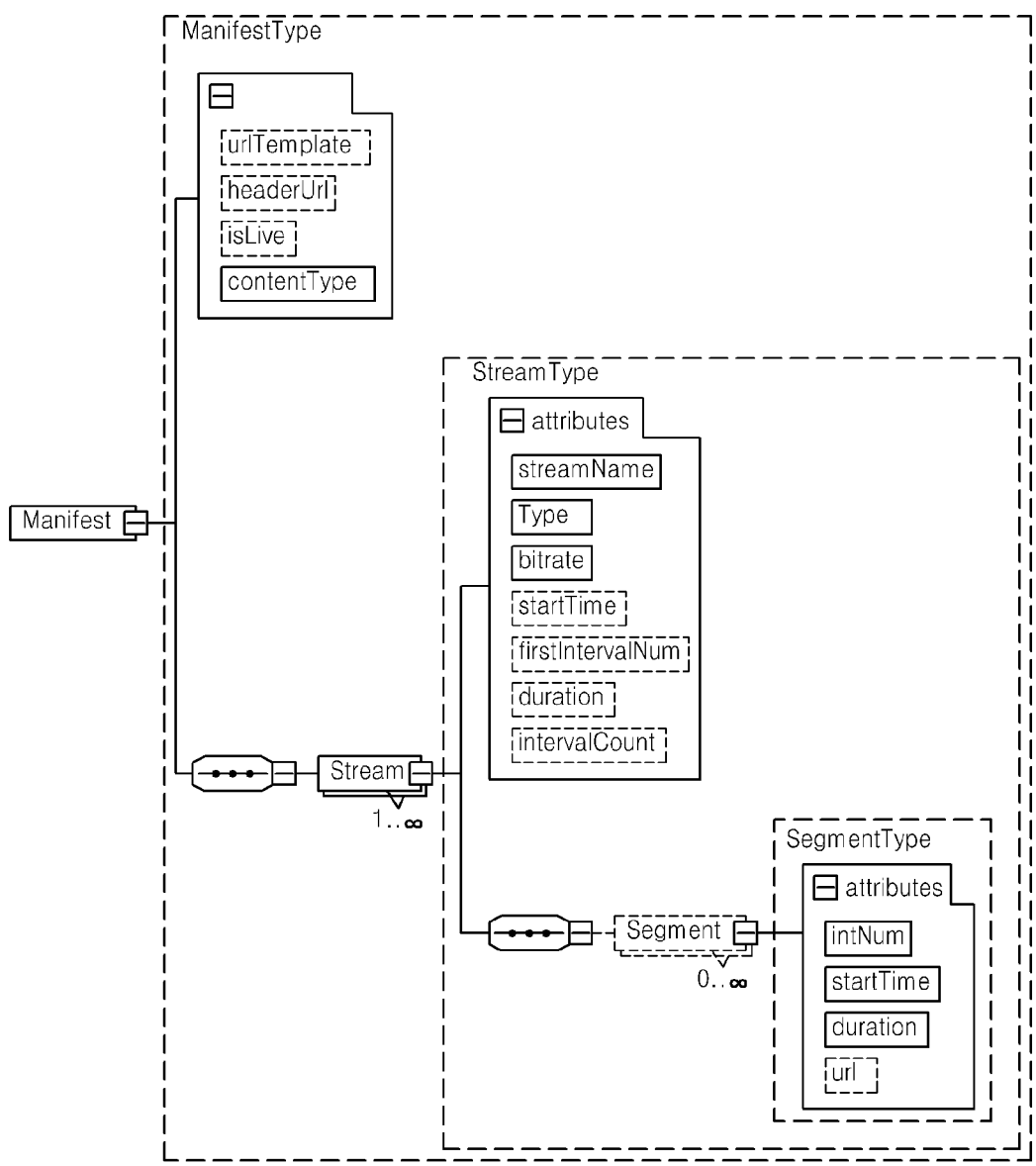
FIGS. 8A and 8B are schemas of a media presentation description according to exemplary embodiments.
Figure 8B:
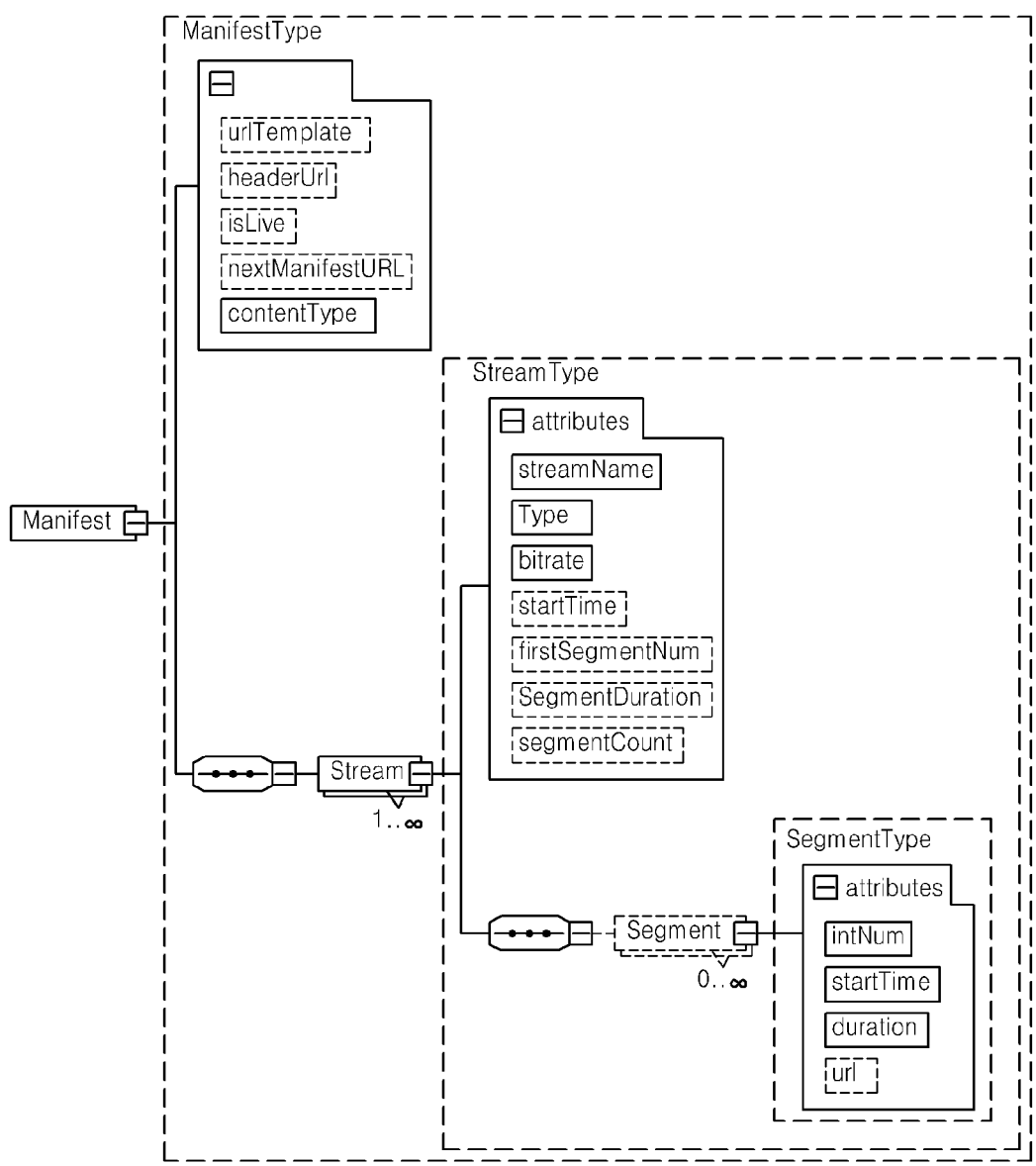

FIGS. 8A and 8B are schemas of a media presentation description according to exemplary embodiments. The media presentation description may comply with the OIPF standard.

Referring to FIG. 8A, the media presentation description according to the present exemplary embodiment includes a template tag about URLs of a plurality of media data, a tag for defining a location of a header, a tag for defining to which service the streaming is related to, a tag for defining a container format of media data, and a tag for defining the plurality of media data.

An "urlTemplate" tag defines a common portion of the URLs of the plurality of media data. For example, if "http://example.com/vod/movie/18888/Track/{TrackID}/Segments/{SegmentID}" is a URL template, a URL of media data may be defined by respectively substituting an ID of each media data and an ID of at least one segment included in each media data for "TrackID" and "SegmentID".

A "headerUrl" tag corresponds to the "RefData" tag described with reference to FIG. 4B. In other words, the "headerUrl" tag defines URLs of headers of the plurality of media data.

An "isLive" tag defines a service related to streaming. For example, when the "isLive" tag is defined as "Live", the streaming is related to a live service, and when the "isLive" tag is defined as "CoD", the streaming is related to a CoD service.

A "contentType" tag defines a container format of media data used during streaming. The "contentType" tag may indicate whether the container format is an MP4 format or an MPEG2-TS format. The container format is an MP4 format or an MPEG2-TS format herein, However, though it is understood that according to an exemplary embodiment the container format is not limited thereto, and any container format for transmitting media data may be used. For example, the "contentType" tag may define that the container format complies with an MPEG Media Transport (MMT) standard.

A "Stream" tag is generated for each media data and defines each media data. In order to define each media data generated by encoding one content to have different qualities, the "Stream" tag includes a "streamName" attribute, a "type" attribute, a "bitrate" attribute, a "startTime" attribute, a "firstIntervalNum" attribute, a "duration" attribute, and an "intervalCount" attribute.

The "streamName" attribute defines a name of media data, and may be an ID of media data. The "type" attribute defines a type of media data, wherein it is defined whether the media data is audio data, video data, or audio/video data. When media data only includes data about an I-frame for a trick play, such information may be defined in the "type" attribute.

The "bitrate" attribute defines a bit rate of media data, the "startTime" attribute defines a time stamp for specifying a starting time of media data, and the "firstIntervalNum" attribute defines a number of a segment that initially starts.

The "duration" attribute defines a duration time of a segment included in media data, and the "intervalCount" attribute defines a total number of at least one segment included in media data.

The "Segment" tag is a sub tag of the "Stream" tag, and as described above, when media data includes at least one segment generated by encoding content in a predetermined quality and dividing the encoded content based on time, each of the at least one segment is defined.

The "IntNum" attribute defines a number of a segment, and the "StartTime" tag defines a starting time of a corresponding segment. The "Duration" tag defines a duration time of a corresponding segment, and the "url" defines a URL of a corresponding segment.

The "Segment" tag is a selective tag, and may not be included in the media presentation description if the information about at least one segment included in the media data can be inferred from other attributes of the "Stream" tag. In other words, when content of the "Segment" tag can be inferred from the "startTime", "firstIntervalNum", "duration", and "intervalCount" attributes defined in the "Stream" tag, the "Segment" tag may not be included in the media presentation description. Also, a "url" attribute of the "Segment" tag may not be required if a predetermined template is defined in the "urlTemplate", and the URLs of segments are inferred by substituting each ID of the plurality of media data and an ID of at least one segment included in each media data with the defined predetermined template.

However, on the other hand, attributes of the "Segment" tag are separately defined for each segment, if the attributes of the "Segment" tag cannot be inferred from other attributes of the "Stream" tag. The attributes of the "Segment" tag may not be inferred if duration times of segments are different. When duration times are different, the duration times of segments included in media data cannot be inferred from the attributes of the "Stream" tag, and thus the duration times of the segments may be each set by using a "duration" attribute of the "Segment" tag. When the duration times of the segments are different, starting times of continuous segments are also different. For example, when a duration time of a first segment of first media data is different from a duration time of a second segment of the first media data, a starting time of the second segment and a starting time of a third segment cannot be inferred from the "Stream" tag. Accordingly, a starting time of each segment may be defined by a "startTime" attribute.

The duration times and/or starting times may be defined by using a sub tag of the "Segment" tag, instead of using the "duration" attribute and the "startTime" attribute of the "Segment" tag. For example, a "Url" tag constituting a sub tag of the "Segment" tag may be set, and a duration time may be defined as an attribute of the "Url" tag, such as "<Url=www.example.com/~/segment.ts, duration=10/>".

According to another exemplary embodiment, duration time may be defined based on a difference between duration times of continuous segments. An upper tag may define a default duration time, and the "Url" tag constituting the sub tag may define only a difference between the default duration time and an actual duration time for each segment. As described above, the "Url" tag constituting the sub tag of the "Segment" tag may be defined as "<Url=www.example.com/~/segment.ts, duration=difference/>". "Difference" denotes a difference between the default duration time and the actual duration time.

When a default duration time of a corresponding segment is defined to be 10 minutes by using the "Stream" tag or the "Segment" tag, and the "Url" tag constituting the sub tag is defined to be "<Url=www.example.com/~/segment.ts, duration=2/>", a duration time of the corresponding segment may be defined to be 10+2=12 minutes.

Referring to FIG. 8B, the media presentation description according to another exemplary embodiment may further include a "nextManifestURL" tag. As described above, when following content is continuously streamed after streaming of one content is completed, such as in the case of live streaming or advertisement insertion, the client 130 requires to pre-know information about the following content so as to stream the following content seamlessly. Accordingly, a URL of a media presentation description of the following content to be streamed after current content may be defined by the "nextManifestURL" tag.

FIGS. 9A, 9B, 9C, 9D, 9E, 9F, 9G and 9H illustrate media presentation descriptions according to exemplary embodiments.

Referring to FIG. 9A, the media presentation description according to an exemplary embodiment includes a "URLTemplate" tag, a "RefDataURL" tag, and a plurality of tags respectively defining a plurality of media data.

The "URLTemplate" tag and the "RefDataURL" tag of FIG. 9A respectively correspond to the "urlTemplate" tag and the "RefDataURL" tag of FIGS. 8A and 8B.

An "ID" attribute, a "Type" attribute, a "BitRate" attribute, a "StartTime" attribute, a "SegmentDuration" attribute, a "SegmentStartID" attribute, and a "SegmentCount" attribute of FIG. 9A respectively correspond to the "streamName" attribute, the "type" attribute, the "bitrate" attribute, the "startTime" attribute, the "duration" attribute of the "Stream" tag, the "firstIntervalNum" attribute of the "Stream" tag, and the "intervalCount" attribute of FIGS. 8A and 8B.

The media presentation description of FIG. 9A includes information about three video data generated by encoding content to have different qualities, information about one audio data, and information about media data generated by encoding only I-frames for a trick play.

Referring to FIG. 9B, the media presentation description according to an exemplary embodiment further includes a "NextAdaptiveControlURL" tag. The "NextAdaptiveControlURL" tag corresponds to the "nextManifestURL" tag of FIG. 8B. Accordingly, a URL of a media presentation description of following content to be reproduced after current content may be defined by the "NextAdaptiveControlURL" tag.

FIG. 9C shows a media presentation description of the following content, when the URL of the media presentation description of the following content to be reproduced after the current content is defined by the "NextAdaptiveControlURL" tag of FIG. 9B. Comparing the media presentation descriptions of FIGS. 9B and 9C, a "StartTime" attribute is different from the media presentation description of the current content of FIG. 9B, since the media presentation description of FIG. 9C is for the following content.

FIGS. 9D and 9E illustrate media presentation descriptions for selectively controlling high quality video reproduction that a user want to perform. FIG. 9D illustrates the media presentation description when a plurality of media data are generated by encoding one content to have 5 different qualities. Here, the media presentation descriptions of FIGS. 9D and 9E are different in a tag including information about video encoded to have high quality, i.e., a "StartTime" attribute and a "SegmentCount" attribute of media data having an "ID" attribute of "5".

The server 120 selectively transmits the media presentation description of FIG. 9D or the media presentation description of FIG. 9E according to a user rating of the client 130. When the user rating of the client 130 is high (for example, when the client 130 is a paid user), the media presentation description of FIG. 9D is transmitted so that high quality video is freely reproduced, and when the user rating of the client 130 is low (for example, when the client 130 is a free user), the media presentation description of FIG. 9E is transmitted so that segments defined by the "SegmentCount" attribute are reproduced from a time defined by the "StartTime" attribute in high quality video.

FIG. 9F illustrates a media presentation description when an advertisement is inserted into content. Referring to FIG.

9F, the media presentation description may include information about advertisement content and main content, which have different "StartTime" attributes. The media presentation description may include information about advertisement content, which is reproduced from "00:00:00" to "00:02:00" at a bit rate of "500000", and information about main content, which is reproduced from "00:02:00" at bit rates of "1000000", "2000000", "3000000", or "4000000". The media presentation description of FIG. 9F may be transmitted from the server 120 to the client 130 if the server 120 provides the advertisement content to the client 130 by encoding the advertisement content to have one bit rate, and provides the main content, which has a different "StartTime" attribute from the advertisement content, to the client 130 by encoding the main content in four different bit rates.

FIG. 9G illustrates a media presentation description including information about advertisement content, according to an exemplary embodiment. A server for providing main content and a server for providing advertisement content may be different. In other words, when the client 130 receives the main content from the server 120 of FIG. 5A and receives the advertisement content from a server other than the server 120, the media presentation description of FIG. 9G may include a URL of the advertisement content. As shown in FIG. 9G, the media presentation description may include the URL of the advertisement content that is encoded to have one quality.

FIG. 9H illustrates a media presentation description including language and subtitle information, according to an exemplary embodiment. Referring to FIG. 9H, audio data may include information about multiple languages. The media presentation description may include information about audio data of multiple languages, wherein an "ID" attribute is "4" or "5", or information about subtitles of multiple languages, wherein the "ID" attribute is "6" or "7".

Since not only the audio data, but also the subtitle may be divided into a plurality of segments according to time, the audio data and the subtitle may be changed to audio data and a subtitle of another language during streaming.

Referring back to FIG. 5A, the client 130 requests the server 120 to transmit at least one of the plurality of media data, in operation 530. The client 130 selects at least one media data that is encoded to have a quality suitable for the streaming environment by referring to the information about the plurality of media data, and requests the server 120 for the selected at least one media data. The client 130 may transmit an HTTP request for requesting the server 120 to transmit a predetermined media data. The server 120 transmits the media data according to the request of the client 130. Alternatively, the server may transmit at least one segment generated by encoding content to have a predetermined quality and dividing the encoded content based on time, to the client 130. The server 120 may transmit the requested media data to the client 130 as an HTTP response to the HTTP request.

Figure 5B:
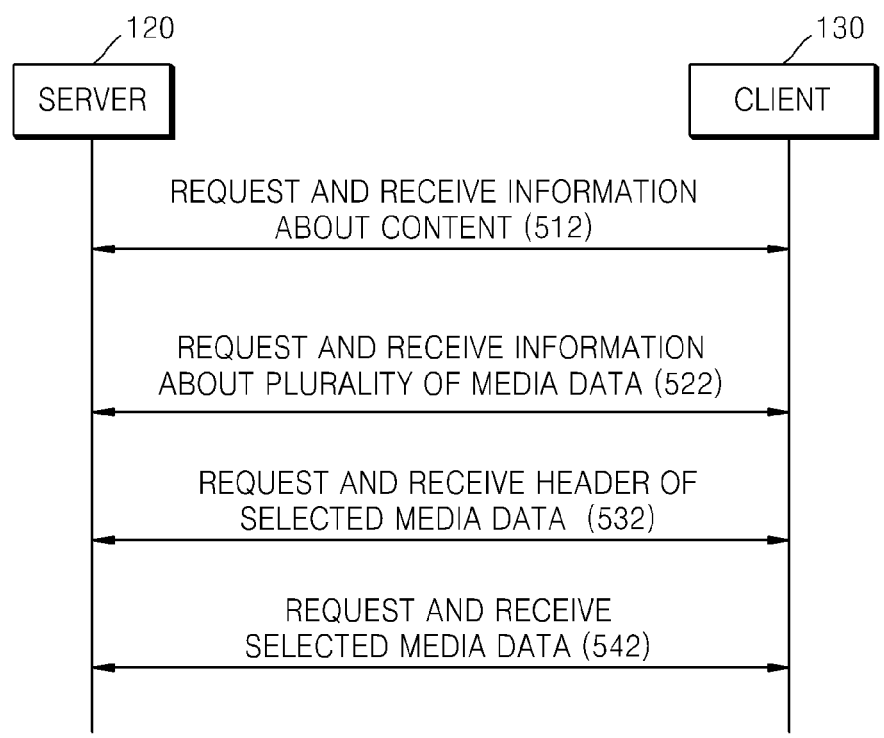

FIG. 5B is a flowchart for describing a streaming method according to another exemplary embodiment.

Referring to FIG. 5B, the client 130 requests the server 120 to transmit information about predetermined content, in operation 512, and receives the information about predetermined content from the server 120. The client 130 may transmit an HTTP request for requesting the server 120 to transmit the information about predetermined content, and receive the information about predetermined content as an HTTP response to the HTTP request. The information about predetermined content may be included in an XML file.

In operation 522, the client 130 requests the server 120 to transmit information about a plurality of media data based on the information about predetermined content received in operation 512. The client 130 may request the server 120 for a media presentation description through the HTTP request, and receive the media presentation description as the HTTP response.

In operation 532, the client 130 requests a header of media data selected based on the information about a plurality of media data received in operation 522. At least one media data that is suitable to a streaming environment is selected from among the plurality of media data based on the information about the plurality of media data received in operation 522, and a header of the selected at least one media data is requested. The header of the selected at least one media data is requested by referring to the information about the plurality of media data received in operation 522. The server 120 transmits a file of the header of the selected at least one media data to the client 130 in response to the request of the client 130.

In operation 542, the client 130 requests the server 120 to transmit selected media data based on the information about the plurality of media data received in operation 522, and the header received in operation 532. The client 130 requests the server 120 to transmit at least one segment generated by encoding content to have a predetermined quality and dividing the encoded content based on time, and the server 120 transmits the requested at least one segment to the client 130.

Figure 10A:
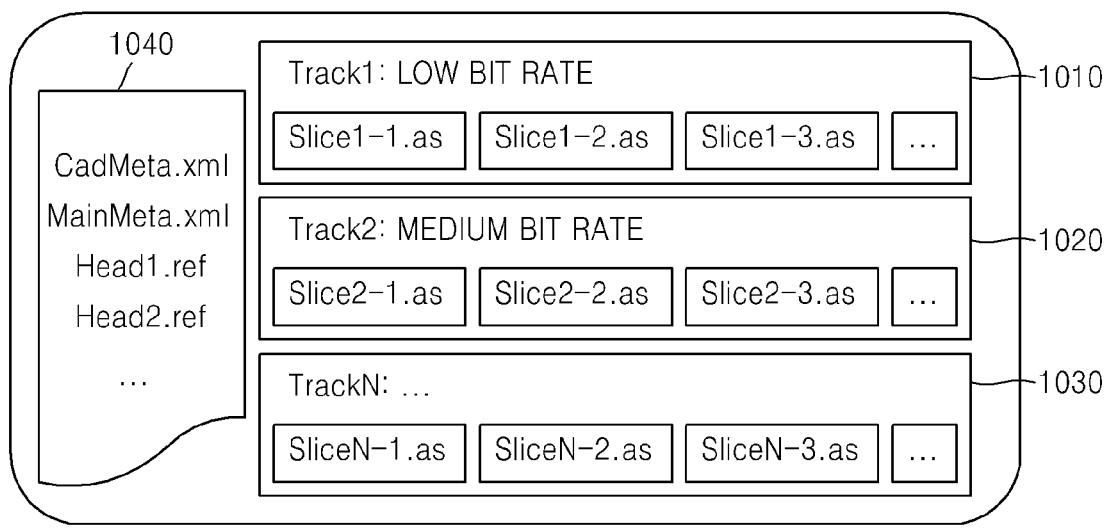
FIGS. 10A, 10B and 10C each illustrate a plurality of media data according to exemplary embodiments.
Figure 10B:
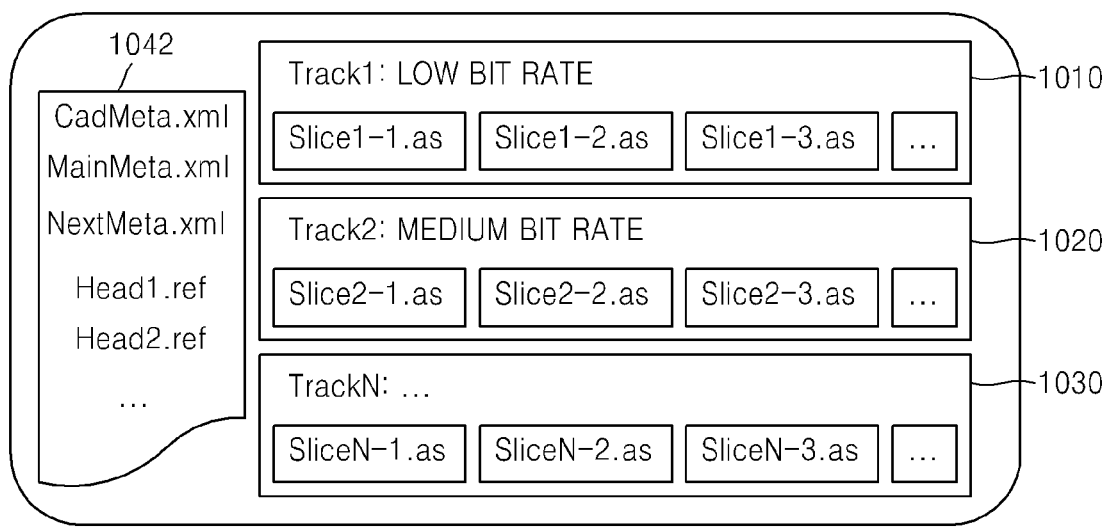
Figure 10C:
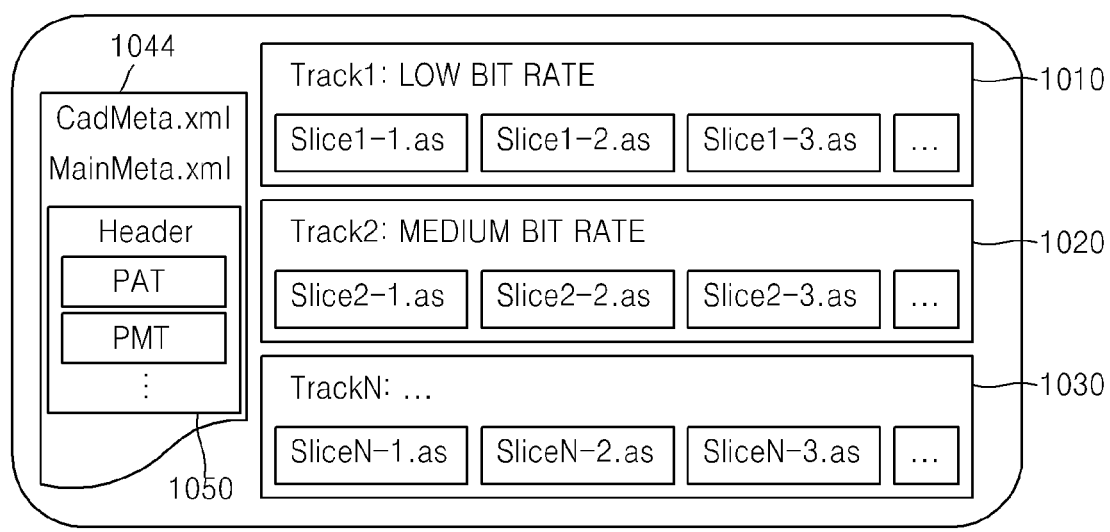

FIGS. 10A, 10B and 10C each illustrate a plurality of media data according to exemplary embodiments. FIGS. 10A, 10B and 10C each illustrate the plurality of media data included in the server 120 to perform the streaming methods according to FIGS. 5A and 5B.

Referring to FIG. 10A, the server 120 may include a plurality of media data 1010 through 1030 generated by encoding one content to have a plurality of different qualities, for streaming that is adaptive to a streaming environment. "Track1" through "TrackN" denote the plurality of media data 1010 through 1030. Also, each of the plurality of media data 1010 through 1030 may include at least one segment generated by dividing each of the plurality of media data 1010 through 1030 based on time. "Slice1-1.as", "Slice1-2.as", "Slice1-3.as", "Slice2-1.as", "Slice2-2.as", "Slice2-3.as", "SliceN-1.as", "SliceN-2.as", and "SliceN-3.as" denote at least one segment.

The server 120 may include information 1040 required for the client 130 to access the plurality of media data 1010 through 1030. The server 120 may include a "CadMeta.xml" file as information about content, a "MainMeta.xml" file as information about the plurality of media data 1010 through 1030, and a "Head1.ref" file, a "Head2.ref" file, etc. as header files of the plurality of media data 1010 through 1030. Here, the "Head1.ref" file may be a header file of the "Track1", and the "Head2.ref" file may be a header file of the "Track2".

The "CadMeta.xml" file may be a CAD file according to the OIPF standard, and the "MainMeta.xml" file may be the media presentation description described above. Also, the "Head1.ref" and "Head2.ref" files are selective elements, and may not exist when headers are included in the plurality of media data 1010 through 1030.

Referring to FIG. 10B, information 1042 required for the client 130 to access the plurality of media data 1010 through 1030 may further include a "NextMeta.xml" file. As described above, the "NextMeta.xml" file may be a media presentation description of a following content to be reproduced after current content. As described above, the media presentation description of the current content, i.e., the "MainMeta.xml" file, includes the URL of the media presentation description of the following content, and thus the client 130 may access the "NextMeta.xml" file based on the "MainMeta.xml" file.

Referring to FIG. 10C, header files of the plurality of media data 1010 through 1030 may exist in one header file 1050. Instead of existing for each of the plurality of media data 1010 through 1030, the header files may exist as one header file 1050 and may be included in information 1044 required to access the plurality of media data 1010 through 1030.

For example, when each of the plurality of media data 1010 through 1030 corresponds to an elementary stream, e.g., an elementary stream according to the MPEG-2 standard, each of the header files of the plurality of media data 1010 through 1030 may be the header file 1050 including a program association table (PAT) and a program map table (PMT). At least one of the PAT and the PMT may be separated from the plurality of media data 1010 through 1030 to prepare the header file 1050, and the media presentation description may include information pointing to the header file 1050. The information pointing to the header file 1050 may be URL information of the header file 1050 or information for specifying a packet including the header file 1050 in a MPEG-2 transport stream (TS). The header file 1050 including at least one of the PAT and the PMT is an initialization segment, and may be transmitted to the client 130 before segments including payload data, so as to initiate reproduction of the plurality of media data 1010 through 1030.

Referring back to operation 532 of FIG. 5B, the client 130 may obtain the information pointing to the header file 1050 by referring to the media presentation description, and may request the header file 1050 based on the information pointing the header file 1050. After requesting and receiving the header file 1050 based on the information pointing to the header file 1050, at least one of the plurality of media data 1010 through 1030 is selected based on at least one of the PAT and the PMT included in the header file 1050, and the selected at least one media data is requested from the server 120. The PAT and the PMT may be separated as the header file 1050 or included in the plurality of media data 1010 through 1030, but may include an entire list of elementary streams included in the plurality of media data 1010 through 1030 regardless of locations of the PAT and the PMT.

According to MPEG-2, packet IDs (PIDs) defined in the PAT and the PMT are different according to elementary streams. Accordingly, PIDs assigned to each of the plurality of media data 1010 through 1030 may be different. Alternatively, according to another exemplary embodiment, since the plurality of media data 1010 through 1030, generated by encoding one content to have different qualities, are elementary streams of the same content, the same PID may be employed.

When the plurality of media data 1010 through 1030 correspond to a plurality of elementary streams according to MPEG-2, each of segments included in the plurality of media data 1010 through 1030 may include at least one continuous packetized elementary stream (PES). However, one PES may be included in only one segment from among the segments. In other words, one PES may not be included in two different segments.

Since a plurality of media data are generated by encoding one content to have different qualities, presentation time stamps (PTSs) and/or decoding time stamps (DTSs) included in PESs of the plurality of media data may be aligned according to reproduction times. In other words, if an initial PES of first media data and an initial PES of second media data are content reproduced at the same time, a PTS and/or a DTS may be equally set.

Further, when the second media data is reproduced while reproducing the first media data by changing media data according to the streaming environment, the PTSs and/or the DTSs may be continuously aligned so that the first and second media data are continuously reproduced. In other words, when the second media data is reproduced while reproducing the first media data, by changing media data, the PTS and/or the DTS of the last PES before the changing of the media data, and the PTS and/or the DTS of the first PES after the changing of the media data, may be continuously set.

The PTS and/or the DTS define a time stamp of video data. Accordingly, time stamps of the plurality of media data with respect to video data are aligned according to the reproduction times of the plurality of media data as described above. Such alignment of the time stamps based on the reproduction times may be equally applied to audio data. In other words, like the time stamps of the plurality of media data with respect to the video data, time stamps of the pieces media data with respect to the audio data may also be aligned according to the reproduction times for adaptive streaming.

Figure 11A:
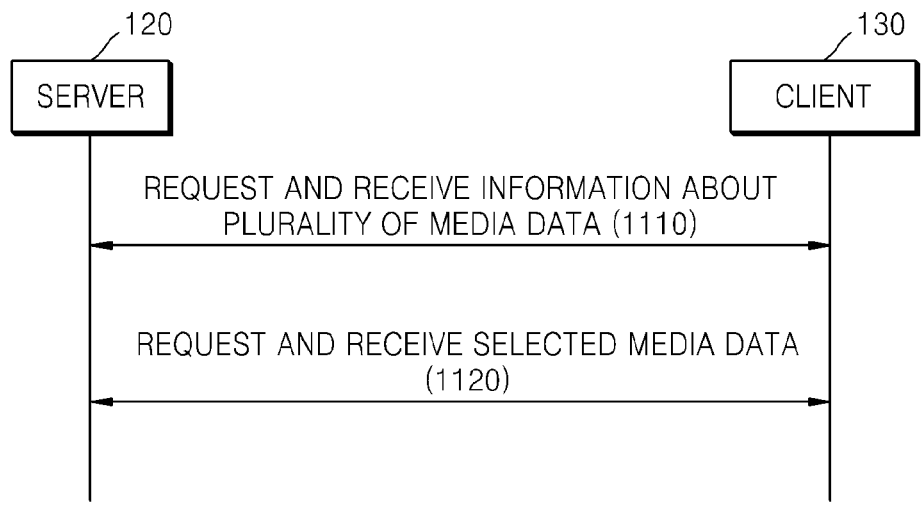
FIGS. 11A and 11B are flowcharts for describing streaming methods according to exemplary embodiments.

FIG. 11A is a flowchart for describing a streaming method according to another exemplary embodiment.

Referring to FIG. 11A, the client 130 requests information about a plurality of media data to the server 120, in operation 1110. The client 130 may request a media presentation description from the server 120 via an HTTP request, and may receive the media presentation description as an HTTP response. The client 130 requests the server 120 for and receives the information about the plurality of media data generated by encoding one content to have a plurality of different qualities, so as to perform streaming that is adaptive to a streaming environment. The streaming method of FIG. 11A is different from the streaming method of FIG. 5A as the information about the plurality of media data is requested and received without requesting and receiving information about content.

In operation 1120, the client 130 requests the server 120 to transmit at least one of the plurality of media data. The client 130 selects and requests at least one media data that is encoded to have a quality suitable for the streaming environment by referring to the information about the plurality of media data, and receives the requested at least one media data from the server 120.

Figure 11B:
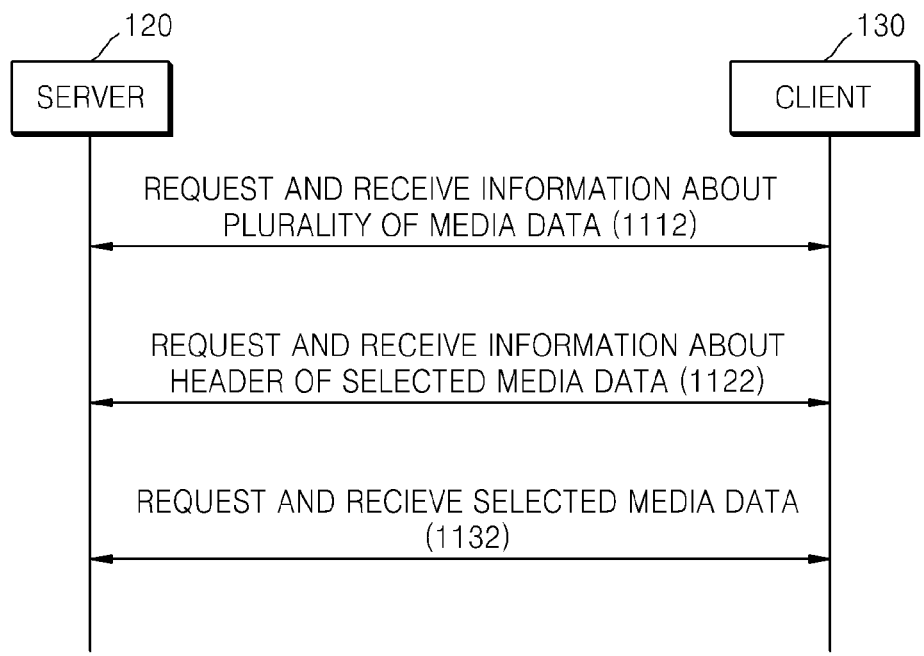

FIG. 11B is a flowchart for describing a streaming method according to another exemplary embodiment.

Referring to FIG. 11B, the client 130 requests the server 120 to transmit information about a plurality of media data and receives the information about the plurality of media data from the server 120 in response to the request, in operation 1112. The client 130 may request the server 120 for a media presentation description through an HTTP request, and receive the media presentation description as an HTTP response.

In operation 1122, the client 130 requests a header of selected media data based on the information about the plurality of media data received in operation 1112. The client 130 requests the header of media data selected according to a streaming environment by referring to the information about the plurality of media data received in operation 1112.

In response to the request, the server 120 transmits a file including the header of the selected media data to the client 130.

In operation 1132, the client 130 requests the server 120 to transmit the media data selected based on the information about the plurality of media data received in operation 1112, and the header received in operation 1122. The client 130 requests the server 120 to transmit at least one segment generated by encoding content in a predetermined quality and dividing the encoded content based on time, and the server 120 transmits the requested at least one segment to the client 130.

Figure 12A:
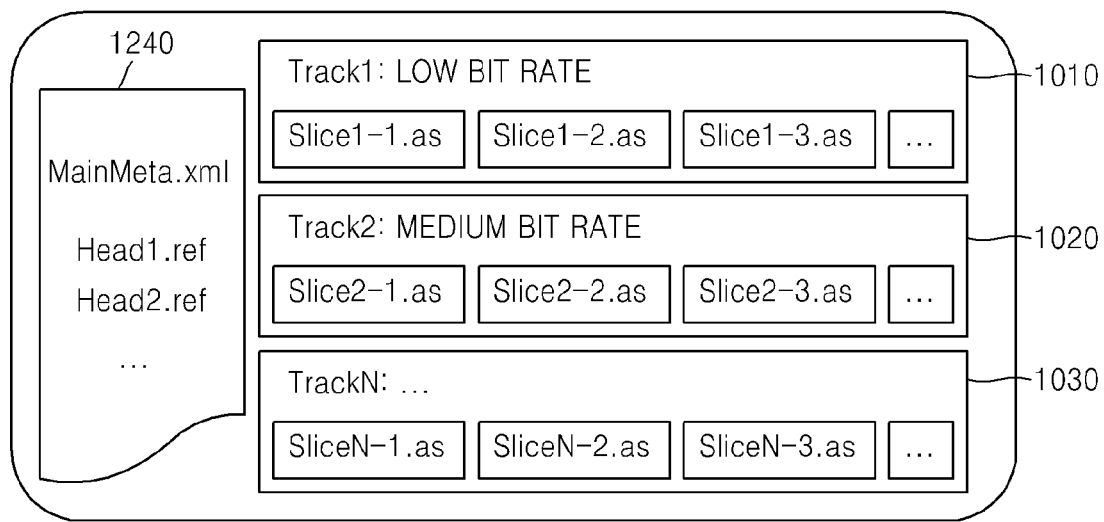
FIGS. 12A, 12 B and 12C each illustrate a plurality of media data according to exemplary embodiments.
Figure 12B:
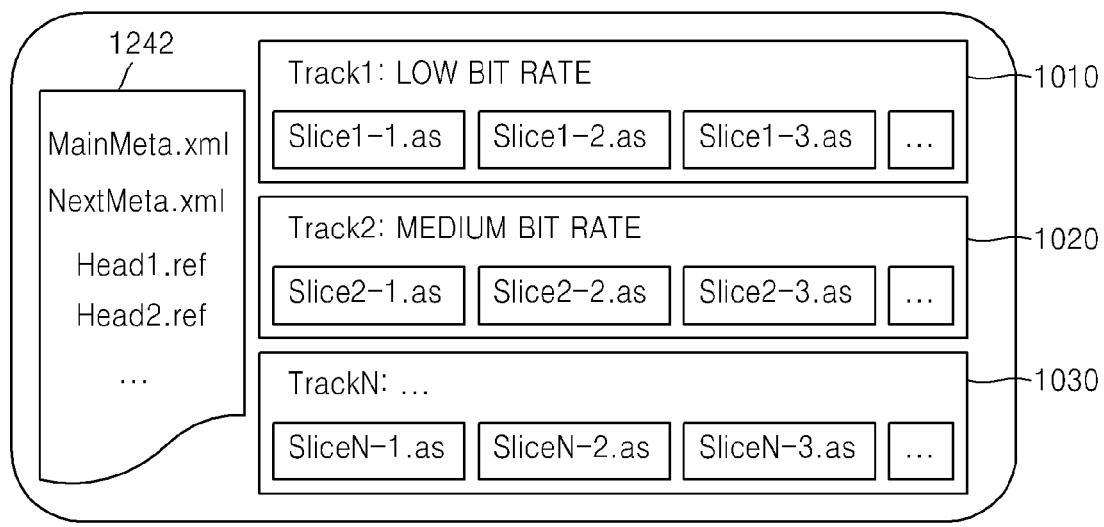
Figure 12C:
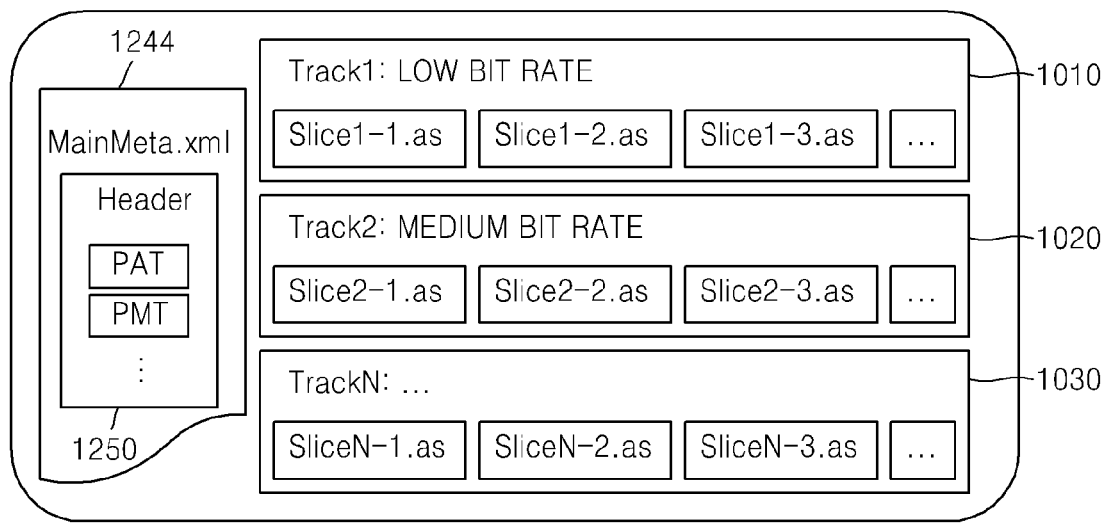

FIGS. 12A, 12B and 12C each illustrate a plurality of media data according to other exemplary embodiments. FIGS. 12A and 12B each illustrate the plurality of media data included in the server 120, which are used to perform the streaming methods of FIGS. 11A and 11B.

Referring to FIG. 12A, the server 120 may include the plurality of media data 1010 through 1030 generated by encoding one content to have the plurality of different qualities for streaming that is adaptive to a streaming environment, as shown in FIG. 10A.

Here, the plurality of media data 1010 through 1030 of FIG. 12A is different from the plurality of media data 1010 through 1030 of FIG. 10A in information 1240 required for the client 130 to access the plurality of media data 1010 through 1030, wherein the server 120 only includes information about the plurality of media data 1010 through 1030 and not information about content, unlike the exemplary embodiment of FIG. 10A. Here, the client 130 may receive the information about content from another entity instead of the server 120, and access the plurality of media data 1010 through 1030 included in the server 120 based on the received information about content.

Referring to FIG. 12B, information 1242 required for the client 130 to access the plurality of media data 1010 through 1030 may be prepared by further including a "Next-Meta.xml" file to the information 1240 of FIG. 12A.

Referring to FIG. 12C, the header files of the plurality of media data 1010 through 1030 may exist in one header file 1250. The header files do not exist for each of the plurality of media data 1010 through 1030, but may be included in information 1244 required to access the plurality of media data 1010 through 1030, as one header file 1250. The header file 1250 corresponds to the header file 1050 of FIG. 10C.

Figure 13:
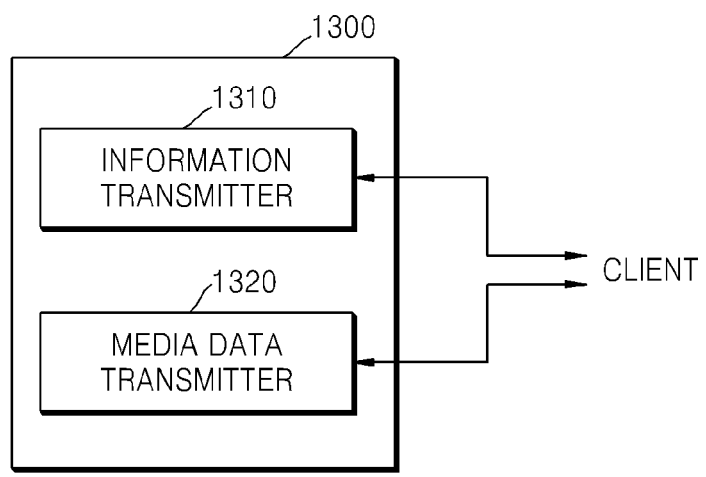
FIG. 13 is a block diagram of an apparatus for transmitting media data, included in a server, according to an exemplary embodiment.

FIG. 13 is a block diagram of an apparatus 1300 for transmitting media data, included in the server 120, according to an exemplary embodiment.

Referring to FIG. 13, the apparatus 1300 of the server 120 includes an information transmitter 1310 and a media data transmitter 1320.

The information transmitter 1310 receives a request to transmit predetermined information from the client 130, and transmits the predetermined information to the client 130 in response to the request. The information transmitter 1310 receives a request to transmit at least one of information about content and information about a plurality of media data from the client 130, and transmits requested information to the client 130. The information transmitter 1310 receives an HTTP request for requesting at least one of the information about content and the information about a plurality of media data from the client 130, and transmits requested information as an HTTP response.

The media data transmitter 1320 receives a request to transmit at least one media data selected from the plurality of media data according to a streaming environment from the client 130, and transmits requested media data to the client 130. The information transmitter 1310 receives a request to transmit media data selected based on the information about the plurality of media data transmitted to the client 130. The server 120 may transmit the requested media data to the client 130 by receiving and storing the plurality of media data encoded to have different qualities by the encoding device 110. Also, the server 120 may receive the requested media data from the encoding device 110 and transmit the requested media data to the client 130 in real-time according to the request of the client 130.

Figure 14:
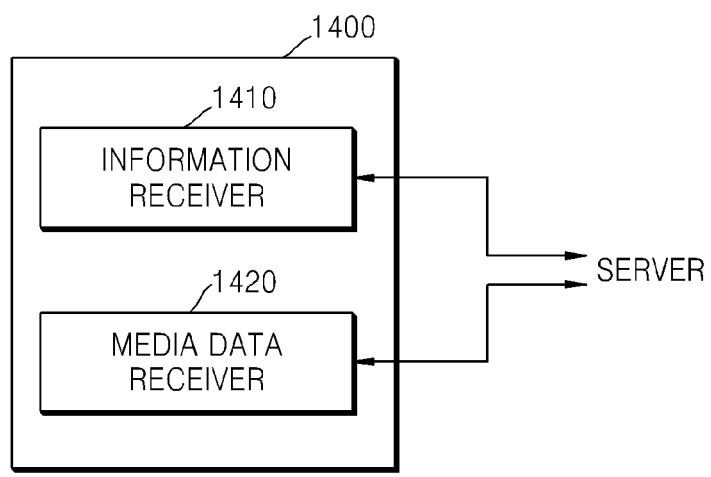
FIG. 14 is a block diagram of an apparatus for receiving media data, included in a client, according to an exemplary embodiment.

FIG. 14 is a block diagram of an apparatus 1400 for receiving media data, included in the client 130, according to an exemplary embodiment.

Referring to FIG. 14, the apparatus 1400 of the client 130 includes an information receiver 1410 and a media data receiver 1420.

The information receiver 1410 transmits a request to transmit predetermined information to the server 120, and receives the predetermined information from the server 120 in response to the request. The information receiver 1410 transmits a request to transmit at least one of information about content and information about a plurality of media data to the server 120, and receives requested information from the server 120. According to the exemplary embodiments of FIGS. 2A, 2B, 5A, 5B, 11A, and 11B, the information receiver 1410 transmits an HTTP request requesting the server 120 to transmit at least one of the information about content and the information about the plurality of media data, and receives requested information as an HTTP response from the server 120.

The media data receiver 1420 transmits a request to transmit at least one media data selected from among the plurality of media data according to a streaming environment to the server 120, and receives requested media data from the server 120. The information receiver 1410 transmits a request to transmit media data selected according to the streaming environment based on the information about the plurality of media data received from the server 120.

According to an exemplary embodiment, streaming that is adaptive to a streaming environment can be performed by using a conventional protocol without having to change a structure of a server and/or a client, and thus an adaptive streaming system that is compatible with various media data formats can be manufactured at low cost.

An exemplary embodiment can also be embodied as computer readable codes on a computer readable recording medium.

For example, a streaming apparatus of a server and a streaming apparatus of a client according to exemplary embodiments may include a bus coupled to each unit of the apparatus 1300 of FIG. 13 and the apparatus of FIG. 14, and at least one processor connected to the bus. Also, the streaming apparatuses may further include a memory coupled to the at least one processor, so as to store a command, a received message, or a generated message, wherein the at least one processor is combined to the bus to perform the command.

The computer readable recording medium is any data storage device that can store data which can be thereafter read by a computer system. Examples of the computer readable recording medium include, but are not limited to, read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of receiving media data, the method comprising:
receiving, from a server, a first file comprising information about attribute information of a plurality of media data and location information of a second file, an identifier of at least one segment in each of the plurality of media data and referencing information of an initialization segment, wherein the plurality of media data are generated by encoding a content to have different properties;
requesting a segment of at least one of the plurality of media data based on the first file, wherein each of the plurality of media data is divided into at least one segment based on time; and
receiving the segment in response to the requesting,
receiving the second file based on the location information included in the first file, wherein the second file includes attribute information of a plurality of external media data and identifiers of a plurality of external segments of each of the plurality of external media data; and
receiving an external segment among the plurality of external segments based on the second file,
wherein the initialization segment is received based on the referencing information,
the initialization segment comprises at least one of a program association table, PAT, or a program map table, PMT, for decoding the at least one media data, and
the first file includes rating information in the form of a uniform resource identifier (URI) for restricting a presentation of the media data to the client.

2. The method of claim 1, wherein the receiving the first file comprises:
transmitting a hypertext transfer protocol (HTTP) request message requesting the server to transmit the first file; and
receiving an HTTP response message including the first file from the server in response to the HTTP request message.

3. The method of claim 1, wherein the first file further comprises information about at least one property of the plurality of media data.

4. The method of claim 3, wherein the first file is configured according to a rating of a user receiving at least one of the plurality of media data.

5. The method of claim 1, wherein the plurality of media data respectively correspond to a plurality of elementary streams.

6. The method of claim 5, wherein the at least one data segment from among the plurality of data segments comprises at least one packetized elementary stream (PES).

7. The method of claim 5, wherein each one of the plurality of media data comprises a respective packetized elementary stream (PES) including a respective presentation time stamp (PTS) and a respective decoding time stamp (DTS),
wherein the method further comprises aligning the respective presentation time stamps and the respective decoding time stamps according to reproduction time.

8. The method of claim 1, wherein the at least one of the PAT and the PMT comprises a list of all of the plurality of media data.

9. The method of claim 1, wherein each one of the plurality of media data is assigned a different respective one of a plurality of packet identifiers (PIDs).

10. The method of claim 1, wherein the first file further comprises information about at least one of: a name, a type, a quality, or a time stamp of each one of the plurality of media data.

* * * * *